(12) United States Patent
Appell et al.

(10) Patent No.: US 11,122,157 B2
(45) Date of Patent: Sep. 14, 2021

(54) TELECOMMUNICATION DEVICE, TELECOMMUNICATION SYSTEM, METHOD FOR OPERATING A TELECOMMUNICATION DEVICE, AND COMPUTER PROGRAM

(71) Applicant: Fraunhofer-Gesellschaft zur Foerderung der angewandten Forschung e.V., Munich (DE)

(72) Inventors: Jens Ekkehart Appell, Brake (DE); Jan Rennies-Hochmuth, Oldenburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/116,204

(22) Filed: Aug. 29, 2018

(65) Prior Publication Data
US 2018/0367657 A1 Dec. 20, 2018

Related U.S. Application Data

(63) Continuation of application No. PCT/EP2017/054651, filed on Feb. 28, 2017.

(30) Foreign Application Priority Data

Feb. 29, 2016 (DE) ..................... 10 2016 203 235.6

(51) Int. Cl.
*H04M 1/68* (2006.01)
*G10L 21/00* (2013.01)
(Continued)

(52) U.S. Cl.
CPC ............... *H04M 1/68* (2013.01); *G10L 15/08* (2013.01); *G10L 15/20* (2013.01); *G10L 2015/088* (2013.01)

(58) Field of Classification Search
USPC ....................................... 381/72, 73.1; 379/7
See application file for complete search history.

(56) References Cited

U.S. PATENT DOCUMENTS 7,088,828 B1 * 8/2006 Bradford .............. G10K 11/178
381/71.1
7,142,894 B2 * 11/2006 Ichikawa .............. H04M 1/585
455/569.1
(Continued)

FOREIGN PATENT DOCUMENTS

CN 101197871 A 6/2008
CN 101461220 A 6/2009
(Continued)

*Primary Examiner* — Quoc D Tran
(74) *Attorney, Agent, or Firm* — Perkins Coie LLP; Michael A. Glenn

(57) ABSTRACT

A telecommunication device includes an audio signal transmission unit configured to receive an audio signal and to transmit the same to a further telecommunication device. The telecommunication device further includes a signaling unit configured to output a signaling when there is a concern that the audio signal is acoustically understandable for third parties or represents a disturbance for third parties. A further telecommunication device includes an audio signal receive unit configured to receive an audio signal from a further telecommunication device and to output the same acoustically, and a signaling unit configured to output a signaling when there is a concern that the output audio signal is acoustically understandable for third parties or represents a disturbance.
The telecommunication devices may be interconnected in a system.
Also described are corresponding methods for operation and a computer program.

21 Claims, 8 Drawing Sheets

(51) Int. Cl.
*G10L 15/08* (2006.01)
*G10L 15/20* (2006.01)

(56) References Cited

U.S. PATENT DOCUMENTS

| | | | |
|---|---|---|---|
| 8,059,828 B2 * | 11/2011 | Ho | H04R 3/00 381/110 |
| 8,170,229 B2 * | 5/2012 | Kesterson | G10K 11/178 381/71.8 |
| 9,361,903 B2 * | 6/2016 | Leorin | G10L 21/0272 |
| 2004/0242160 A1 | 12/2004 | Ichikawa et al. | |
| 2006/0247919 A1 * | 11/2006 | Specht | G10L 21/06 704/201 |
| 2007/0055513 A1 * | 3/2007 | Hwang | H04M 1/68 704/233 |
| 2007/0285234 A1 | 12/2007 | Hovmalm et al. | |
| 2009/0030693 A1 | 1/2009 | Shaffer et al. | |
| 2009/0061882 A1 * | 3/2009 | Sweeney | G10K 11/178 455/445 |
| 2009/0097665 A1 * | 4/2009 | L'Esperance | H04S 7/00 381/57 |
| 2009/0171670 A1 * | 7/2009 | Bailey | G10L 21/06 704/278 |
| 2009/0190770 A1 | 7/2009 | Kesterson | |
| 2010/0020940 A1 | 1/2010 | Zad-issa et al. | |
| 2011/0263233 A1 * | 10/2011 | Mikan | H04M 1/72519 455/414.1 |
| 2012/0121096 A1 | 5/2012 | Chen et al. | |
| 2013/0084834 A1 | 4/2013 | Tivyan et al. | |
| 2015/0110277 A1 | 4/2015 | Pidgeon et al. | |

FOREIGN PATENT DOCUMENTS

| | | |
|---|---|---|
| CN | 103973863 A | 8/2014 |
| CN | 105120063 A | 12/2015 |
| EP | 2247082 A1 | 11/2010 |
| JP | 2000069126 A | 3/2000 |
| JP | 2001025062 A | 1/2001 |
| JP | 2004032430 A | 1/2004 |
| JP | 2005236790 A | 9/2005 |
| JP | 2006287949 A | 10/2006 |
| JP | 2007060229 A | 3/2007 |
| JP | 2007235810 A | 9/2007 |
| JP | 2007258771 A | 10/2007 |
| JP | 2009284501 A | 12/2009 |
| JP | 2010199741 A | 9/2010 |
| JP | 2014072753 A | 4/2014 |
| KR | 20120051595 A | 5/2012 |
| KR | 20140092324 A | 7/2014 |

* cited by examiner

TELECOMMUNICATION DEVICE, TELECOMMUNICATION SYSTEM, METHOD FOR OPERATING A TELECOMMUNICATION DEVICE, AND COMPUTER PROGRAM

CROSS-REFERENCES TO RELATED APPLICATIONS

This application is a continuation of copending International Application No. PCT/EP2017/054651, filed Feb. 28, 2017, which is incorporated herein by reference in its entirety, and additionally claims priority from German Application No. DE 10 2016 203 235.6, filed Feb. 29, 2016, which is incorporated herein by reference in its entirety.

BACKGROUND OF THE INVENTION

Embodiments according to the present invention relate to a telecommunication device.

Further embodiments according to the present invention relate to a telecommunication system.

Further embodiments according to the present invention relate to a method for operating a telecommunication device.

Further embodiments according to the present invention relate to a computer program for performing said method.

Embodiments according to the present invention relate to a concept and a method for measuring and presenting one's own speech level in a telephone call.

In the last decades, the possibilities for transmitting speech signals or audio signals in general have been significantly improved. In particular, today it is possible to transmit speech signals, or audio signals, in many situations, e.g., from one's home, from the office or on the way. For example, mobile telephony is possible today with complete coverage in some regions, i.e., from public locations and public transport means. Although the possibility to make telephone calls at almost any location has significantly improved or simplified the life of human beings, the new possibilities also bring with them certain problems. For example, many people feel disturbed when another person nearby makes a telephone call since a telephone call often feels less natural than a direct conversation between two people. Furthermore, problems also arise with respect to the privacy of conversations, in particular, when having conversations via mobile communication devices, which were in the past held in a private situation or from an office.

SUMMARY

According to an embodiment, a telecommunication device may have: an audio signal transmission unit configured to receive an audio signal and to transmit the same to a further telecommunication device; and a signaling unit configured to output a signaling when there is a concern that the audio signal is acoustically understandable for third parties or represents a disturbance for third parties; wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon; wherein the signaling unit is configured to consider an acoustic environment of the telecommunication device in determining or calculating the speech understandability; wherein the signaling unit is configured to consider a disturbing noise frequency content and/or a disturbing noise modulation and/or a disturbing noise noisiness and/or a reverberation time in determining or calculating the speech understandability.

According to another embodiment, a telecommunication device may have: an audio signal receive unit configured to receive an audio signal from a further telecommunication device and to acoustically output the same; and a signaling unit configured to output a signaling when there is a concern that the output audio signal is acoustically understandable for third parties or represents a disturbance for third parties; wherein the signaling unit is configured to determine or estimate a speech understandability of a speech signal generated by a sound transducer of the telecommunication device for a third party who is located in a surrounding area of the telecommunication device, and wherein the signaling unit is configured to output the signaling depending thereon.

According to another embodiment, a telecommunication system for transmitting an audio signal from a first telecommunication device to a second telecommunication device may have: a first telecommunication device with an audio signal transmission unit configured to receive an audio signal from a user and to transmit the same to a second telecommunication device; and a second telecommunication device with an audio signal receive unit configured to receive an audio signal from the first telecommunication device and to acoustically output the same, and a signaling unit configured to output a signaling signal to the first telecommunication device when there is a concern that the audio signal output by the second telecommunication device is acoustically understandable for third parties or represents a disturbance for third parties; wherein the signaling unit of the second telecommunication device is configured to determine or estimate a speech understandability of a speech signal generated by a sound transducer of the second telecommunication device for a third party who is located in a surrounding area of the second telecommunication device, and wherein the signaling unit is configured to output the signaling signal depending thereon; wherein the first telecommunication device has a signaling unit configured to, in response to a signaling signal received by the second telecommunication device, output a signaling in order to signal to a user of the first telecommunication device that there is a concern that the audio signal output by the second telecommunication device is acoustically understandable for third parties or represents a disturbance for third parties.

According to another embodiment, a method for operating a telecommunication device may have the steps of: receiving an audio signal; transmitting the audio signal to a further telecommunication device; and outputting a signaling when there is a concern that the audio signal is acoustically understandable for third parties or represents a disturbance for third parties; wherein a speech understandability of a speech signal generated by a user of the telecommunication device is determined or estimated for a third party who is located in a surrounding area of the telecommunication device, and wherein the signaling is output depending thereon; wherein an acoustic environment of the telecommunication device is considered in determining or calculating the speech understandability; wherein a disturbing noise frequency content and/or a disturbing noise modulation and/or a disturbing noise noisiness and/or a reverberation time is considered in determining or calculating the speech understandability.

According to another embodiment, a method for operating a telecommunication device may have the steps of: receiving an audio signal from a further telecommunication device;

acoustically outputting the received audio signal; and outputting a signaling when there is a concern that the output audio signal is acoustically understandable for third parties or represents a disturbance for third parties; wherein a speech understandability of a speech signal generated by a sound transducer of the telecommunication device is determined or estimated for a third party who is located in a surrounding area of the telecommunication device, and wherein the signaling is output depending thereon.

Another embodiment may have a non-transitory digital storage medium having a computer program stored thereon to perform the method for operating a telecommunication device having the steps of: receiving an audio signal; transmitting the audio signal to a further telecommunication device; and outputting a signaling when there is a concern that the audio signal is acoustically understandable for third parties or represents a disturbance for third parties; wherein a speech understandability of a speech signal generated by a user of the telecommunication device is determined or estimated for a third party who is located in a surrounding area of the telecommunication device, and wherein the signaling is output depending thereon; wherein an acoustic environment of the telecommunication device is considered in determining or calculating the speech understandability; wherein a disturbing noise frequency content and/or a disturbing noise modulation and/or a disturbing noise noisiness and/or a reverberation time is considered in determining or calculating the speech understandability, when said computer program is run by a computer.

Another embodiment may have a non-transitory digital storage medium having a computer program stored thereon to perform the method for operating a telecommunication device having the steps of: receiving an audio signal from a further telecommunication device; acoustically outputting the received audio signal; and outputting a signaling when there is a concern that the output audio signal is acoustically understandable for third parties or represents a disturbance for third parties; wherein a speech understandability of a speech signal generated by a sound transducer of the telecommunication device is determined or estimated for a third party who is located in a surrounding area of the telecommunication device, and wherein the signaling is output depending thereon, when said computer program is run by a computer.

According to another embodiment, a telecommunication device may have: an audio signal transmission unit configured to receive an audio signal and to transmit the same to a further telecommunication device; and a signaling unit configured to output a signaling when there is a concern that the audio signal is acoustically understandable for third parties or represents a disturbance for third parties; wherein the telecommunication device is configured to receive from the further telecommunication device a signaling transmission signal indicating whether there is a concern that the audio signal, after being output by a sound transducer of the further telecommunication device, is acoustically understandable for a third party who is located in a surrounding area of the further telecommunication device and who differs from a user of the further telecommunication device, wherein the signaling unit is configured to trigger a signaling when the signaling unit finds corresponding information in the signaling transmission signal and to deactivate the signaling when the signaling transmission signal indicates that there is no concern that the audio signal is acoustically understandable for third parties.

According to another embodiment, a telecommunication device may have: an audio signal transmission unit configured to receive an audio signal and to transmit the same to a further telecommunication device; and a signaling unit configured to output a signaling when there is a concern that the audio signal is acoustically understandable for third parties or represents a disturbance for third parties; wherein the signaling unit is configured to determine and output information about a size of an area in which there is a concern that the audio signal is acoustically understandable for third parties, wherein the signaling unit is configured to determine or estimate in which area a ratio between the audio signal and disturbing noise reaches or exceeds a certain value, wherein such an area is interpreted by the signaling unit as an area in which there is a concern that the audio signal is acoustically understandable for third parties.

According to another embodiment, a telecommunication device may have: an audio signal transmission unit configured to receive an audio signal and to transmit the same to a further telecommunication device; and a signaling unit configured to output a signaling when there is a concern that the audio signal is acoustically understandable for third parties or represents a disturbance for third parties; wherein the signaling unit is configured to determine and output a measurement for a disturbance of third parties by the audio signal; wherein the telecommunication device is configured to capture acoustic characteristics in the surrounding area of the telecommunication device and/or usage guidelines in the surrounding area of the telecommunication device and to determine the measurement for the disturbance of third parties depending thereon.

According to another embodiment, a telecommunication device may have: an audio signal transmission unit configured to receive an audio signal and to transmit the same to a further telecommunication device; and a signaling unit configured to output a signaling when there is a concern that the audio signal is acoustically understandable for third parties or represents a disturbance for third parties; wherein the telecommunication device is configured to receive a disturbance signaling from a third-party device that differs from the further telecommunication device, and wherein the signaling unit is configured to consider the disturbance signaling upon an evaluation as to whether there is a concern that the audio signal is acoustically understandable for third parties or represents a disturbance for third parties.

An embodiment according to the present invention provides a telecommunication device. The telecommunication device includes an audio signal transmission means configured to receive an audio signal and to transmit the same to a further telecommunication device. The telecommunication device further includes a signaling means configured to output a signaling when there is a concern (i.e., when there is a reason for concern justified by technical parameters, for example) that the audio signal is acoustically understandable for third parties or represents a disturbance for third parties.

This embodiment is based on the finding that it is desirable to inform, or warn, a user via a signaling if an audio signal that is transmitted by the audio signal transmission means to a further telecommunication device is also understandable for third parties (i.e., for people other than the speaker on the side of the telecommunication device and the desired receiver on the side of the further telecommunication device) or if third parties (either on the side of the user or the receiver) are being disturbed by the audio signal.

In particular, it has been found that a support of the user by a signaling means contained in the telecommunication device is very helpful, since a user, e.g., who concentrates on a telephone call, often does not perceive that he/she speaks "too loudly". Thus, via the signaling means, which considers, or evaluates, the speech volume of the user of the telecommunication device and/or the speech understandability of the audio signal generated by the user of the telecommunication device and/or further technical conditions (the type or arrangement of the microphone or the question if a handsfree unit is used on the side of the telecommunication device or on the side of a further telecommunication device to which the audio signal is transmitted), for example, a user of the telecommunication device may be supported and an impairment of the privacy, or a disturbance of third parties, may be reduced or eliminated.

The signaling may occur in many ways, e.g., optically and/or acoustically. The signaling may occur directly via the terminal device or via a further device connected to the terminal device in a wireless or wired manner (e.g., an audio output device connected to the telecommunication device in a wireless or wired manner and/or a further electronic device connected to the telecommunication device in a wired or wireless manner).

In embodiments, the signaling means is configured to determine or estimate whether there is a concern that the audio signal is acoustically understandable for a third party who is located in a surrounding area of the telecommunication device and who differs from a user of the telecommunication device, and to output the signaling depending thereon. In other words, the signaling means may be configured to determine or evaluate how loudly the user of the audio device is speaking (wherein the audio signal is typically generated by the user of the telecommunication device), which makes it possible to infer the risk that the audio signal is understandable and/or disturbing for a third party who is located in the surrounding area of the telecommunication device. If the signaling means (e.g., by evaluating one or several technical parameters) detects that the probability is comparably high (e.g., higher than a specified probability threshold), the signaling means may output the corresponding signaling. Thus, a user of the telecommunication device is informed in time when third parties that are located in his/her vicinity may readily understand his/her comments, or when he/she would disturb or disturbs third parties located in his/her vicinity beyond what is acceptable.

In an embodiment, the signaling means is configured to obtain information as to whether there is a concern that the audio signal is acoustically understandable for a third party who is located in a surrounding area of the further telecommunication device and who differs from the user of the further telecommunication device, and to output the signaling depending thereon. Thus, the user of the telecommunication device may also be warned by the signaling when third parties may listen to him/her speak on the side of his telecommunication partner (i.e., at a location at which the "further telecommunication device" is located). For example, this could be the case when the telecommunication partner, i.e., the user of the further telecommunication device, uses a handsfree unit (or loudspeaker unit). Thus, as a reaction to the signaling, the user of the telecommunication device could ask his/her telecommunication partner to ensure privacy, (i.e., to switch off the handsfree unit and/or loudspeaker device, for example), or the user of the telecommunication device could also hold back private information that is not to be disclosed to third parties if his/her telecommunication device signals that the audio signal is acoustically understandable for a third party who is located in the surrounding area of the further telecommunication device. Thus, the user of the telecommunication device may also react when there is the risk that the privacy of the telephone call is not ensured.

In an embodiment, the signaling means may be configured to determine or estimate whether there is a concern that the audio signal may be understandable for a third party who is located in a surrounding area of the telecommunication device, but who is at least at a specified distance to the telecommunication device. In other words, the signaling means may determine or estimate if the audio signal (which may be based on the speech of the user of the telecommunication device, for example) is still understandable at a significant distance to the telecommunication device. In other words, the signaling means may determine, e.g., if the speech signal comprises a volume or speech understandability that allows to expect that the speech signal is only understandable nearby the telecommunication device (e.g., this is the case when a user speaks directly into the microphone of his/her mobile phone and does not speak very loudly), or whether it is to be expected that the speech signal is still understandable at a larger distance to the telecommunication device (e.g., this is the case when the user speaks relatively loudly in spite of a low ambient noise). Thus, the signaling means may output a signaling when it is to be expected that third parties whose distance to the telecommunication device is significantly larger than a normal distance of use, or speaking distance, may still understand the audio signal with relatively low effort. Thus, the user is again warned about potential undesired listeners or people that are potentially being disturbed.

In an embodiment, the signaling means is configured to evaluate the received audio signal in order to determine or estimate whether there is a concern that the audio signal is understandable for a third party who is located in a surrounding area of the telecommunication device and who differs from the user of the telecommunication device. Alternatively, the signaling means may also be configured to evaluate a signal from a separate sound transducer (i.e., from a sound transducer that differs from the sound transducer used for capturing an electric representation of the audio signal, for example) in order to determine or estimate whether there is a concern that the audio signal is acoustically understandable for a third party who is located in a surrounding area of the telecommunication device and who differs from the user of the telecommunication device. While the first option (evaluation of the typically electric audio signal received from the audio signal transmission means) enables a particularly simple implementation, the second option (using a separate sound transducer) is accompanied by a particularly high reliability since a second signal path is opened and, therefore, the situation (speech volume and/or speech understandability) may be evaluated at the location of the telecommunication device (or at the location of the separate sound transducer) even when the audio signal is captured by a particularly attached sound transducer (e.g., by a microphone located close to the head of the user), for example. Thus, by using a separate sound transducer, a meaningful signaling may be generated even when the sound transducer (e.g., a microphone) capturing the audio signal is optimized as to an effective suppression of ambient noise, or is arranged accordingly.

In an embodiment, the telecommunication device is configured to receive from the further telecommunication device a signal indicating whether there is a concern that the audio signal, after being output by a sound transducer of the further telecommunication device, is acoustically understandable for a third party who is located in a surrounding area of the further telecommunication device and who differs from a user of the further telecommunication device. Through the corresponding implementation, it is possible that the present telecommunication device operates together with a remote telecommunication device (the further telecommunication device) and obtains from this telecommunication device information as to whether there is a particular risk on the side of the further telecommunication device that unauthorized (or undesired) third parties may understand the user of the present telecommunication device. Thus, through the communication with the further telecommunication device, the user of the present telecommunication device obtains an additional level of control about possible undesired listeners. Due to the present telecommunication device carrying out the signaling corresponding to (or in response to) the signal received by the further telecommunication device, a reliable signaling may be carried out without the user of the present telecommunication device having to ask the user of the further telecommunication device (possibly repeatedly). Thus, important and private calls may be carried out in a relaxed manner.

In an embodiment, the signaling means is configured to output the signals depending on a speech level of a user of the telecommunication device. The output of the signaling depending on the speech level (in the simplest case exclusively based on the speech level) enables a comparably simple realization of the signaling means. Furthermore, the speech level already enables a certain statement as to the level of risk that third parties may easily listen in to a telephone call, or are disturbed by a telephone call, for example.

In a further embodiment, the signaling means is configured to output the signaling depending on an acoustic volume of the audio signal at a location of the telecommunication device and/or depending on an electric or digitalized signal level of the received audio signal (in a representation as an electric signal). Such a realization of the signaling means allows for a comparably reliable signaling with lower effort.

In a further embodiment, the signaling means is configured to determine or estimate a speech understandability of a speech signal generated by a user of the telecommunication device for a third party who is located in a surrounding area of the telecommunication device. In this case, the telecommunication device is configured to output the signaling depending thereon. This embodiment is based on the finding that the speech understandability is an important measurement in order to decide whether an audio signal is acoustically understandable for third parties or whether the audio signal represents a disturbance for third parties. A speech signal with a relatively low speech understandability involves a comparably low risk that unauthorized third parties may listen in, which is why the signaling means should not output a signaling for speech signals having a comparably low speech understandability, however, the signaling means should output a signaling for speech signals having a comparably better speech understandability. Furthermore, it has also been shown that third parties are generally more disturbed by comparatively easily understandable speech signals than by comparatively poorly understandable speech signals (which are only slightly louder than background noise, for example).

In an embodiment, the signaling means is configured to consider an acoustic environment of the telecommunication device in determining or calculating the speech understandability. For example, disturbing noise or particular conditions of the respective location (attenuation, echo, etc.) may be taken into account. Thus, the signaling means may obtain particularly meaningful information as to whether the audio signal is acoustically understandable for third parties and/or whether the audio signal represents a disturbance for third parties. Thus, the significance of the signaling generated by the signaling means is increased.

In an embodiment, the signaling apparatus is configured to consider a disturbing noise level and/or a disturbing noise frequency content and/or a disturbing noise modulation and/or a disturbing noise noisiness and/or a reverberation time in determining the speech understandability. With the signaling means taking one or several of the above-mentioned criteria into account, a particularly meaningful signaling may be obtained with justifiable technical effort.

In an embodiment, the signaling means is configured to determine and output information about a size of an area in which there is a concern that the audio signal is acoustically understandable for third parties. For example, it may be determined or estimated in which area a ratio between the audio signal (e.g., speech signal) and disturbing noise reaches or exceeds a certain value, wherein such an area may be interpreted by the signaling means as an area in which there is a concern that the audio signal is acoustically understandable for third parties. In other words, the signaling means may generate the signaling under the assumption that the audio signal is understandable for third parties in an area or leads to a disturbance for third parties, in which the speech understandability (or another criterion that may be derived from a speech level and/or a speech understandability, for example) reaches or exceeds a certain value. Through a corresponding signaling and through the output of information about the size of the area in which there is a concern that the audio signal is acoustically understandable for third parties, a user may be warned about the dangers of others listening in. Determining and outputting information about the size of an area in which there is a concern that the audio signal is acoustically understandable for third parties allows the user to estimate if people within the certain area are a danger to his/her privacy, or for the privacy of the conversation, and the user may react accordingly, e.g., by creating a sufficient distance to those around him/her or by limiting a telephone conversation to contents that are not confidential or just a slightly.

In a further embodiment, the signaling means is configured to determine and output a measurement for a disturbance of third parties by the audio signal. In this way, a user that is concentrated in a telephone call, for example, may be warned in time before he/she disturbs people around him/her, for example. Thus, due to the presence of the signaling apparatus in a telecommunication device, human conflicts such as a fight in a public means of transportation may be prevented.

In an embodiment, the telecommunication device may be configured to detect acoustic characteristics of the surrounding area of the telecommunication device and/or usage guidelines in the surrounding area of the telecommunication device and to determine the measurement for the disturbance of third parties depending thereon. For example, it may be assumed that in a rather loud environment, a certain audio signal (e.g., a telephone call) is perceived by third parties to be less disturbing as is the case in a quiet environment, for example. Furthermore, e.g., the signaling means may be capable of detecting particular usage limitations such as command of silence or a call ban (wherein the signaling of the usage limitations may be carried out via different communication paths such as wireless network communication, near field communication or another indication, for example) and to consider these when generating the signaling. In this way, the fact that a tolerance threshold, e.g., for a telephone call in a silent zone (e.g., in a hospital or in a sleeping car of a train), may be lower than in other areas may allowed for via a technical measure. Thus, the user of the telecommunication device may be warned in time before tolerance thresholds of others are exceeded.

In a further embodiment, the telecommunication device is configured to receive a disturbance signaling from a third-party device that differs from the further telecommunication device. In this case, the signaling means is configured to trigger an evaluation as to whether there is a concern that the audio signal is acoustically understandable for third parties or represents a disturbance for third parties depending on the disturbance signaling or to consider the disturbance signaling in the evaluation. By this implementation, it is possible that third parties (i.e., a user of a third-party device, for example) may send a message to the telecommunication device that there is a disturbance (e.g., that its user speaks too loudly). However, the telecommunication device may forward such a message not just in an unconsidered manner to the user, for example, but may also check, using the signaling means, whether there really is a concern for a disturbance of third parties. Thus, on the one hand, a disturbance signaling by a third party may be used by the signaling means as grounds for a check whether there really is concern for a disturbance, however, not every (possibly unjustified) disturbance signaling of a third party automatically leads to a disturbing notification of the user of the telecommunication device. For example, the disturbance signaling by a third party may be used by the signaling means to increase or decrease threshold values used to decide whether a signaling is carried out. For example, the disturbance signaling by the third party may increase the sensitivity of the signaling means so that, already at low speech levels of the user of the telecommunication device, the possibility of a disturbance of third parties is assumed and a signaling is carried out.

Thus, it is achieved that a disturbance signaling by third parties influence the signaling means without each disturbance signaling of a third party necessarily leading to the output of a signaling by the signaling means (which, on the other hand, could be disturbing for the user of the telecommunication device).

A further embodiment according to the invention provides a telecommunication device. The telecommunication device includes an audio signal receive means configured to receive an audio signal from a further telecommunication device and to acoustically output the same. Furthermore, the telecommunication device includes a signaling means configured to output a signaling when there is a concern that the output audio signal is acoustically understandable for third parties or represents a disturbance for third parties.

Thus, the corresponding telecommunication device offers the possibility that not only disturbances by the speech signal of the user of the telecommunication device may be signalized, but also disturbances by an audio signal that is received from a further telecommunication device and is acoustically output. Thus, it may be signaled to the user of the telecommunication device, for example, when there is a concern that unauthorized third parties may understand what is said by a remote conversational partner. Similarly, it may be signaled to the user of the telecommunication device, e.g., when the use of a hands-free function, or loudspeaker function, of the telephone may lead to disturbances of others around. Furthermore, the signaling may also be carried out to the further remote telecommunication device so that the user of the further remote telecommunication device may be made aware when the privacy is disturbed by the fact that what is said by him/her is output on the side of the telecommunication device in such a loud manner that there is a concern that third parties may listen in. Thus, the herein-described telecommunication device may also interact with the above-described telecommunication device, and a telecommunication participant may be warned when his/her conversational partner uses the handsfree unit such that parties may listen in.

In an embodiment, the signaling means may be configured to determine or estimate whether there is a concern that the audio signal is acoustically understandable for a third party who is located in a surrounding area of the telecommunication device and who differs from a user of the telecommunication device. This signaling means may be further configured to output the signaling depending thereon (i.e., depending on the above-mentioned determination and/or estimation).

In a further embodiment, the signaling means may be configured to determine or estimate whether there is a concern that the audio signal is understandable for a third party who is located in a surrounding area of the telecommunication device, but who is at a larger than specified distance to the telecommunication device. This allows for the circumstance that an "authorized" user of the telecommunication device actually is to perceive the received and acoustically output audio signal, while, on the other hand, the received and acoustically output audio signal is not to be understandable for third parties that are typically located further away from the telecommunication device than its authorized user.

In a further embodiment, the signaling means is configured to determine a signaling depending on a volume with which the audio signal is acoustically output. The embodiment is based on the finding that the volume with which the audio signal is acoustically output represents an important criterion as to whether there is a concern that the output audio signal is acoustically understandable for third parties or represents a disturbance for third parties.

In a further embodiment, the signaling means is configured to determine the signaling depending on whether the audio signal is output via a sound transducer determined for a direct reproduction for an individual user, or via a sound transducer determined for a remote reproduction to another or several users. Thus, the signaling means may allow for the fact that an audio signal that is output via an internal loudspeaker of a mobile telephone is hardly understandable for third parties whose ears are comparably far away from the mobile telephone, while an acoustic reproduction of the received audio signal via a handsfree unit (i.e., via a sound transducer determined for a remote reproduction to one or several users) is typically well-understandable for third parties, for example. Thus, for example, the signaling means may be configured to, in the generation of the signaling and/or in the decision as to whether a signaling is to be output or not, consider characteristics (e.g., radiation characteristics and/or directional characteristics) of a sound transducer used for outputting the received audio signal.

In a further embodiment, the signaling means is configured to determine or estimate a speech understandability of a speech signal generated by a sound transducer of the telecommunication device for a third party who is located in a surrounding area of the telecommunication device. In this case, the signaling means may be configured to output the signaling depending thereon (i.e., depending on the determined or estimated speech understandability). In this way, the signaling may be realistically adapted to the conditions, e.g., by carrying out a signaling at a given volume of the speech signal generated by the sound transducer of the telecommunication device only when an ambient noise level is comparably low (but not when an ambient noise level is comparably high).

In a further embodiment, the telecommunication device is configured to send the signaling via a transmission path to the further telecommunication device. By this, it may be signaled to a user of the further telecommunication device that there is a risk of unauthorized third parties listening in, allowing the user of the further telecommunication device to adjust his/her call behavior, for example.

A further embodiment provides a telecommunication system for transmitting an audio signal from a first telecommunication device to a second telecommunication device. The telecommunication system includes a first telecommunication device with an audio signal transmission means configured to receive an audio signal from a user and to transmit the same to a further telecommunication device. Furthermore, the telecommunication system includes a second telecommunication device with an audio signal receive means configured to receive an audio signal from the first telecommunication device and acoustically output the same, and a signaling means configured to output a signaling signal to the first telecommunication device when there is a concern that the audio signal output by the second telecommunication device is acoustically understandable for third parties or represents a disturbance for third parties. The first telecommunication device further includes a signaling means configured to output, in response to a signaling signal received by the second telecommunication device, a signaling in order to signal to a user of the first telecommunication device that there is a concern that the audio signal output by the second telecommunication device is acoustically understandable for third parties or represents a disturbance for third parties. Due to the corresponding system concept, a user of the first telecommunication device may be warned, e.g., when his/her speech signal is output on the side of the second telecommunication device in such a loud manner that the same is understandable for third parties or that the same disturbs third parties. Thus, security gaps in the communication via the telecommunication devices may be kept low.

A further embodiment provides a method for operating a telecommunication device. The method includes receiving an audio signal and transmitting the audio signal to a further telecommunication device. The method further includes outputting a signaling when there is a concern that the audio signal is acoustically understandable for third parties or represents a disturbance for third parties. The method is based on the same concepts as the above-described telecommunication devices.

A further embodiment provides a further method for operating a telecommunication device. This method includes receiving an audio signal from a further telecommunication device as well as acoustically outputting the received audio signal. The method further includes outputting a signaling when there is a concern that the output audio signal is acoustically understandable for third parties or represents a disturbance for third parties. This method is also based on the same concepts as the above-described telecommunication devices.

A further embodiment provides a computer program for performing said methods when the computer program is executed on a computer.

The computer program is also based on the same concepts as the above-mentioned methods and/or the mentioned telecommunication devices.

BRIEF DESCRIPTION OF THE DRAWINGS

Embodiments of the present invention will be detailed subsequently referring to the appended drawings, in which.

DETAILED DESCRIPTION OF THE INVENTION

1. Embodiment Accorded to FIG. 1

Figure 1:
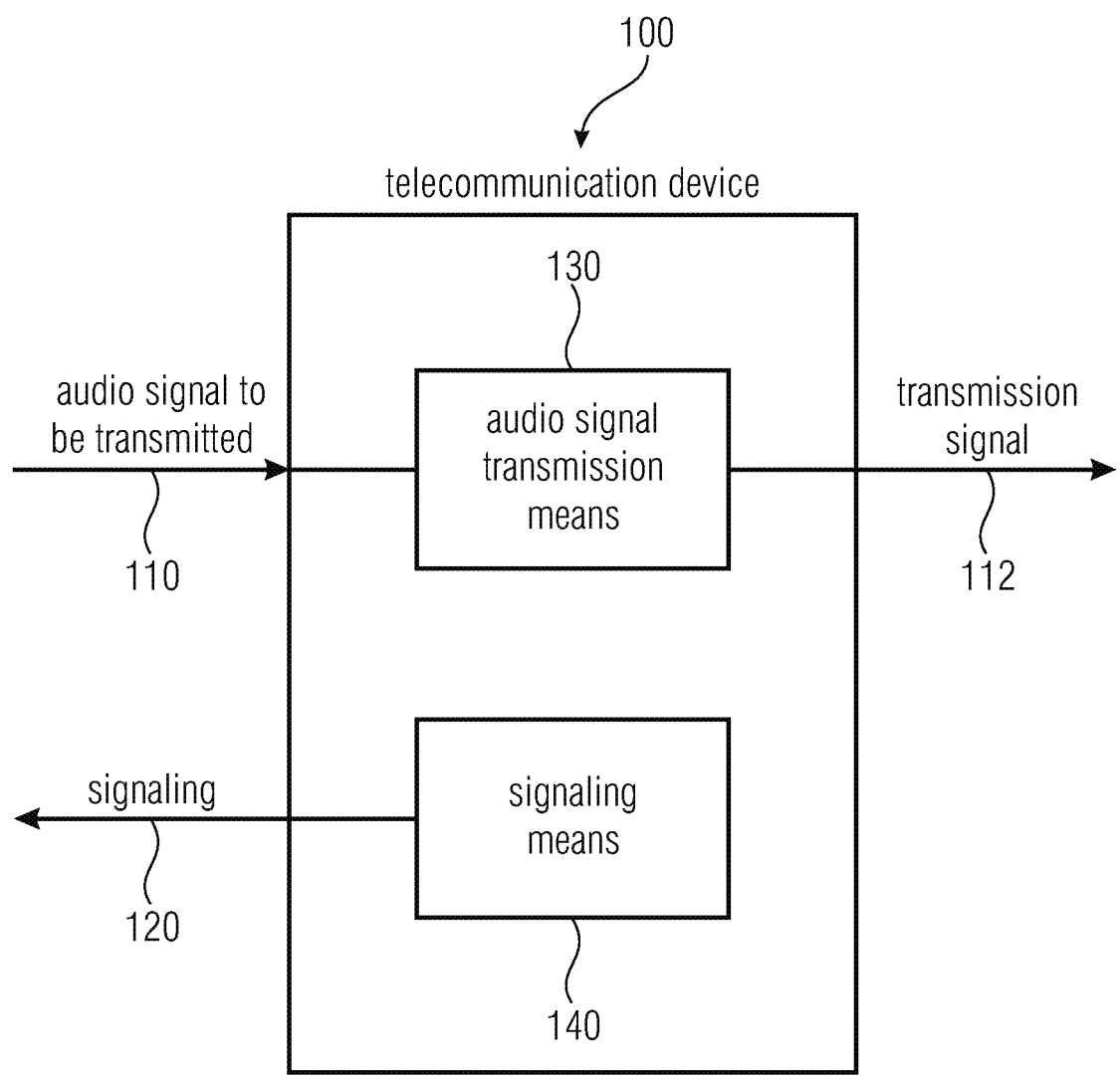
FIG. 1 shows a block diagram of a telecommunication device according to a further embodiment of the present invention.

FIG. 1 shows a block diagram of a telecommunication device according to an embodiment of the present invention.

The telecommunication device 100 is configured to receive an audio signal 110 to be transmitted and to provide based thereon a transmission signal 112 including the audio signal to be transmitted in a coded or uncoded representation. The telecommunication device 100 is further configured to output a signaling 120 to a user. The telecommunication device 100 includes an audio signal transmission means 130 configured to receive the audio signal 110 and to transmit the same to a further telecommunication device. For this purpose, the transmission signal 112 is provided. The telecommunication device 100 further includes a signaling means 140 configured to output the signaling 120 when there is a concern that the audio signal is acoustically understandable for third parties or represents a disturbance for third parties.

In the following, the mode of operation of the telecommunication device 100 is explained in more detail. It is assumed that a user of the telecommunication device 100 generates an audio signal (e.g., a speech signal, alternatively also a music signal or another audio signal) as an acoustic signal. This acoustic signal may either be directly captured by the telecommunication device 100 (e.g., using a microphone contained in the telecommunication device 100), or an electric or optical signal representing the acoustic signal generated by the user of the telecommunication device 100 may be generated by an external sound transducer. Herein, this electric, optical or digitalized representation of the acoustic signal is also referred to as "audio signal" in the same way as the acoustic signal that the user of the telecommunication device 100 outputs. Thus, the audio signal transmission means 130 may process the electric or optical representation or digitalized version of the audio signal and convert the same into a suitable signal form that is suitable for transmission to a further telecommunication device. The transmission signal 112, which, further to possible additional information (e.g., signaling information, error protection information, metadata information, etc.), in particular represents the audio signal 110 to be transmitted, may be adapted to a transmission medium that is used. For example, the transmission signal 112 may be adapted for transmission in a telephone network. Alternatively, the transmission signal 110 may be adapted for transmission in a wired or wireless data network. The audio signal transmission means 130 may therefore add the transmitted audio signal in a digital or analog form to the transmission signal 112. For example, the audio signal transmission means 130 may digitalize the audio signal 110 (if the audio signal 110 is not yet present in a digitalized form) and add the digitalized signal in a compressed bitrate-efficient manner to the transmission signal 112. However, the audio signal transmission means 130 may also add the audio signal 110 to be transmitted in an uncompressed form to the transmission signal 112. Regarding the representation of the audio signal 110 to be transmitted in the transmission signal 112, any known concepts for transmitting audio signals in an analog or digital manner may be used.

The signaling means 140 is configured to output a signaling to the user of the telecommunication device 100, e.g., when, due to a rule-based evaluation of one or several audio signals or due to other signaling signals, the signaling means infers that there is a concern that the audio signal is acoustically understandable for third parties and/or represents a disturbance for third parties. In other words, the signaling means may evaluate, e.g., specified decision rules and may decide based on an evaluation result whether a signaling is to be output or not, e.g., the signaling being output when the result of the evaluation of the decision rule leads to a result for which it has been predefined that it indicates the presence of a problematic situation (i.e., a situation in which there is a concern that the audio signal is acoustically understandable for third parties or represents a disturbance for third parties, for example).

For example, the signaling may take place optically or acoustically. In this case, the signaling means may directly control a signaling element (e.g., a light-emitting diode or an acoustic signal generator) or may forward a message to a sequencing controller having an higher order, which then has the final responsibility for the output of an optical or acoustic signal, for example. The sequencing controller having a higher order may be a microprocessor, or micro controller, of the telecommunication device, which is responsible for display outputs or for generating signaling tones, for example.

Thus, the telecommunication device 100 allows signaling to a user when a problematic situation is present in which there is a concern that the audio signal is acoustically understandable for third parties or in which there is a concern that the audio signal represents a disturbance for third parties. In the first case, confidentiality of the communication may be improved since the user may be reminded by the signaling when there is a concern that unauthorized third parties may listen in to what he/she says. In a second case, social conflicts may be avoided by warning the user of the telecommunication means in time when he/she speaks too loudly (either too loudly in an absolute manner or louder than appropriate considering the ambient noise).

Furthermore, the signaling may also take place when the signaling means obtains information, e.g., via a corresponding message from a further telecommunication device, that what is said by the user of the telecommunication device is made acoustically understandable for unauthorized third parties at a different location.

Further details regarding the signaling means are described in the following.

2. Embodiment According FIG. 2

Figure 2:
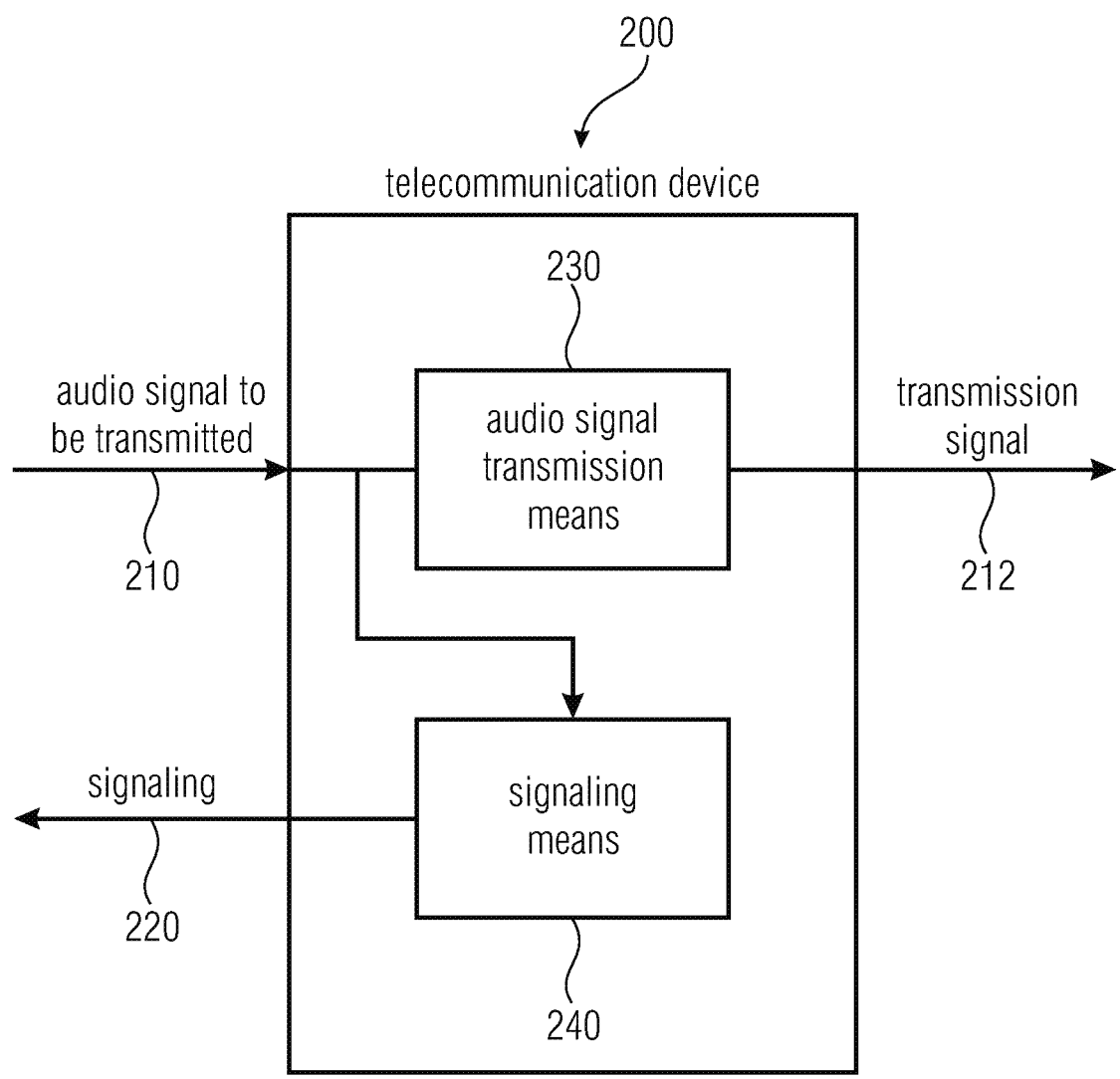
FIG. 2 shows a block diagram of a telecommunication device according to a further embodiment of the present invention.

FIG. 2 shows a block diagram of a telecommunication device 200 according to an embodiment of the present invention. The telecommunication device 200 is configured to receive an audio signal 210 to be transmitted and to provide a transmission signal 212. The telecommunication device 200 includes an audio signal transmission means 230 and a signaling means 240. It is to be noted that the above comments regarding the audio signal 110 apply to the audio signal 210. Regarding the transmission signal 212, the above comments regarding the transmission signal 112 also apply, and regarding the audio signal transmission means 230, the above comments regarding the audio signal transmission means 130 apply.

The signaling means 240 is configured to receive the audio signal 210 to be transmitted (e.g., in the form of a representation as an electric or optical signal or in the form of a representation as a digital signal). The signaling means 240 is configured to generate the signaling 220 based on the audio signal 210 to be transmitted.

For example, the signaling means 240 is configured to determine a speech level of the audio signal 210 and/or to determine a speech understandability of the audio signal 210. Furthermore, the signaling means 240 may be configured to evaluate the determined speech level and/or the determined speech understandability (e.g., compare the same to a specified or variable reference value) and output the signaling based on the result of the comparison or not.

Thus, it is possible to signal with a low technical effort to the user of the telecommunication device when there is a concern that the audio signal is acoustically understandable for third parties or represents a disturbance for third parties. The result which the signaling means obtains by evaluating the above-described evaluation rule is considered herein as comparatively reliable information as to whether the understandability of the audio signal by third parties is a concern, or whether a disturbance for third parties is a concern.

Thus, the corresponding telecommunication device is very suitable to warn the user about possible security risks, or disturbances of adjacent people.

3. Embodiment According to FIG. 3

Figure 3:
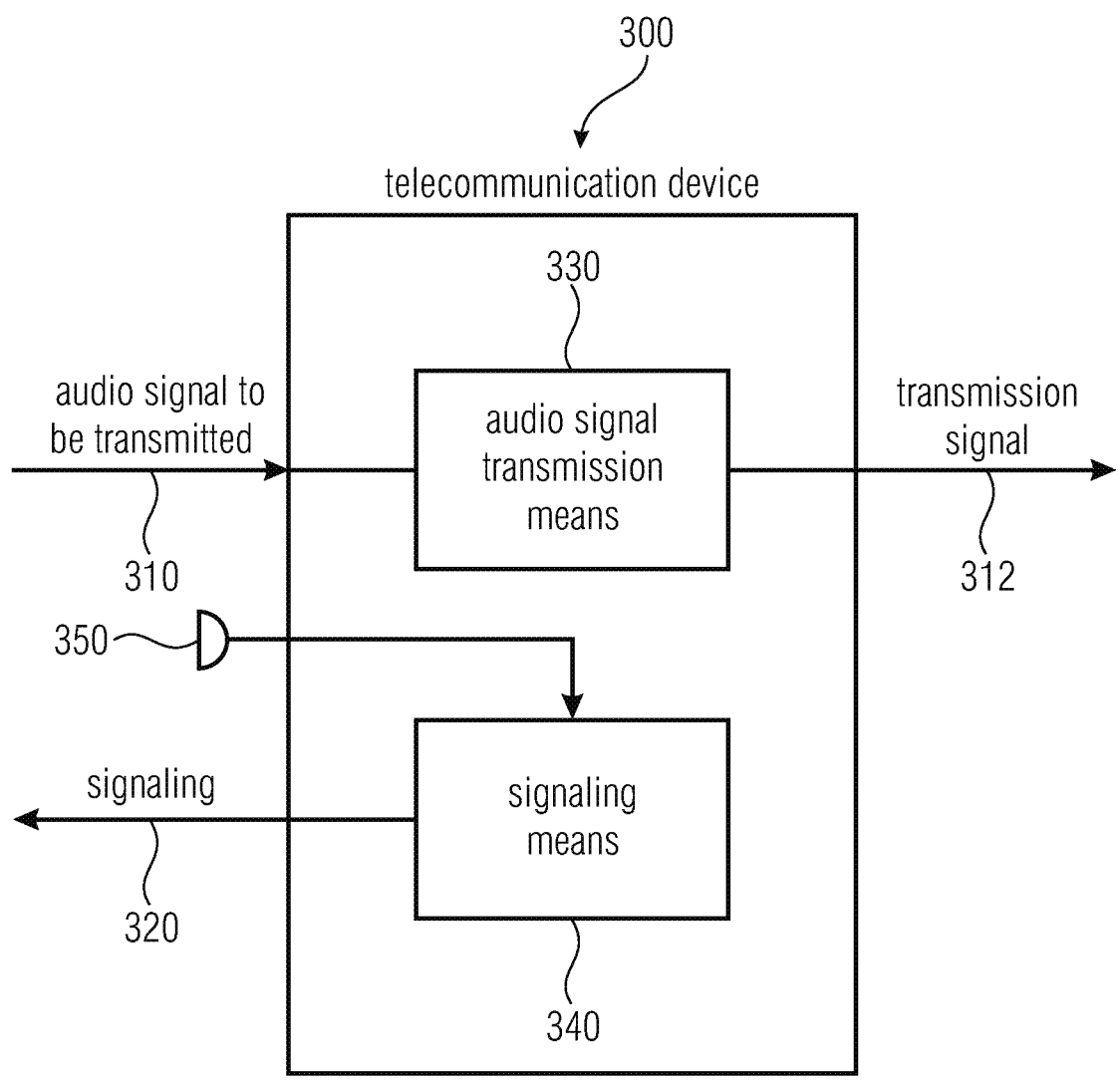
FIG. 3 shows a block diagram of a telecommunication device according to a further embodiment of the present invention.

FIG. 3 shows a block diagram of a telecommunication device according to a further embodiment of the invention.

The telecommunication device 300 according to FIG. 3 is configured to receive an audio signal 310 to be transmitted and provide a transmission signal 312 based thereon. Furthermore, the telecommunication device 300 is configured to provide a signaling 320. It is understood that the audio signal 310 to be transmitted corresponds to the audio signals 110, 210. The transmission signal 312 corresponds to the transmission signals 112, 212. Thus, the above comments apply. The telecommunication device 310 further includes an audio signal transmission means 330 corresponding to the audio signal transmission means 230 and/or the audio signal transmission means 130.

The telecommunication device 300 further includes a sound transducer 350 which may comprise a microphone or a similar component, for example. The telecommunication device 300 further includes a signaling means 340 which may correspond in its fundamental functionality to the signaling means 140 and/or the signaling means 240. However, the signaling means 340 is configured to, e.g., receive a microphone signal from the microphone, or sound transducer 350. Thus, the signaling means 340 may use the microphone signal from the (separate) sound transducer 350 instead of the audio signal 310 to be transmitted, for example, to decide based on the microphone signal from the microphone 350 whether a signaling 320 is to be output or not. Furthermore, the signaling means 340 may—optionally—additionally involve the audio signal 310 to be transmitted in the evaluation as well.

Thus, it is possible, via a separate sound transducer that may have another characteristic than the sound transducer used for capturing the audio signal 310 to be transmitted, for example, obtain information about the extent to which, e.g., this feature of the user of the telecommunication device 300 disturbs people in a surrounding area of the user, or how well the user's speech is perceivable in a surrounding area (and therefore understandable for third parties). Using a separate sound transducer may be advantageous since the sound transducer used for generating the audio signal 310 to be transmitted may be optimized to capture the speech signal of the user, for example. However, the further sound transducer 350 may also be adapted, for example, to capture ambient noise to a higher degree than the sound transducer used for generating the audio signal 310 to be transmitted. Furthermore, the sound transducer 350 may typically be located at a different location than the sound transducer used for capturing the audio signal 310 to be transmitted. Thus, it is to be noted that the separate sound transducer 350 may in many situations provide a more realistic overview as to how well understandable the speech of the user of the telecommunication device 300 is for third parties, or how large the disturbance potential is for third parties, which originates from the speech of the user of the telecommunication device 300.

Furthermore, it is to be noted that the telecommunication device 300 comprises some advantages with regard to the above-described telecommunication devices, however, higher costs arise due to using a separate sound transducer 350.

4. Embodiment According to FIG. 4

Figure 4:
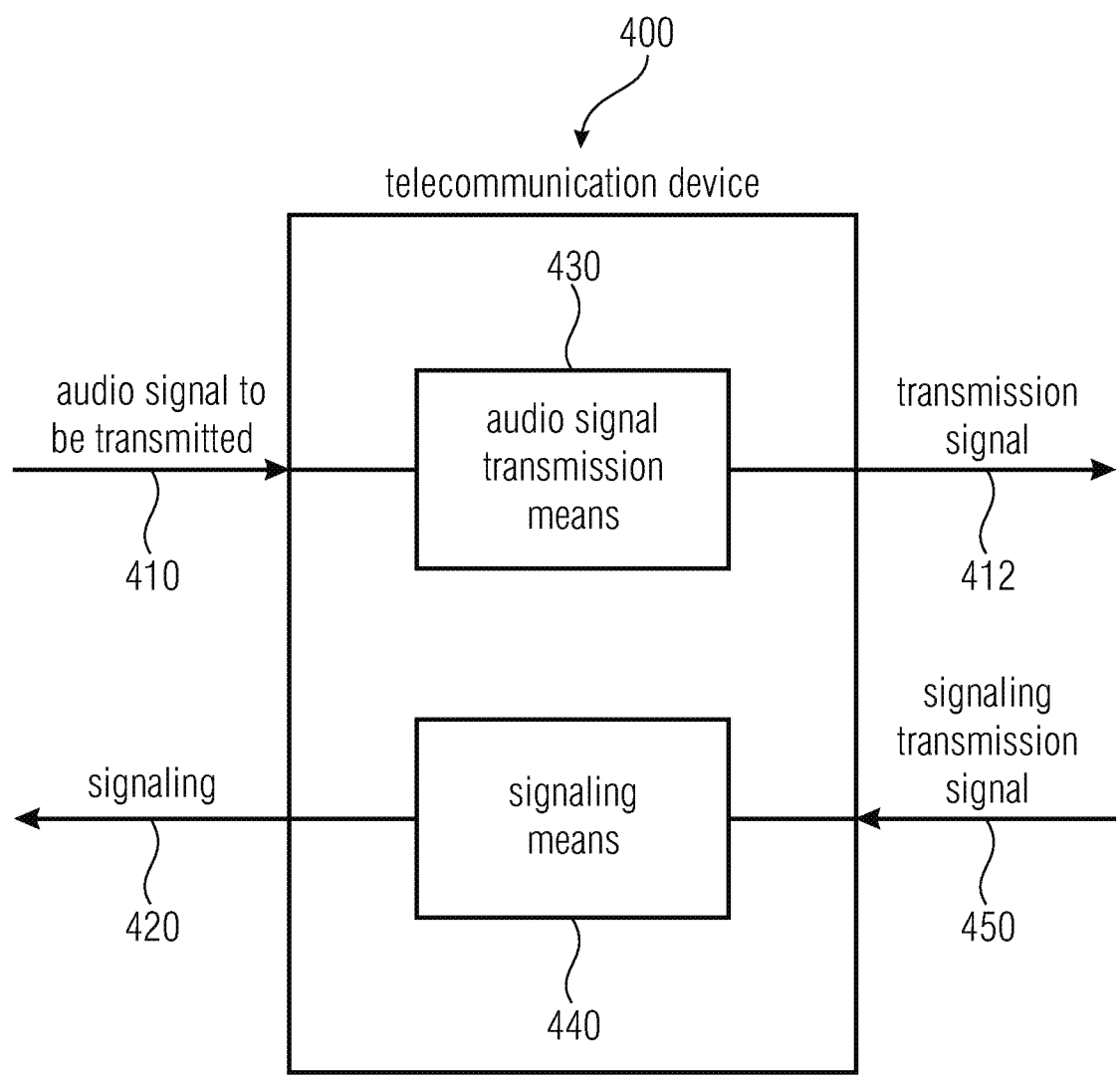
FIG. 4 shows a block diagram of a telecommunication device according to a further embodiment of the present invention.

FIG. 4 shows a block diagram of a telecommunication device according to a further embodiment.

The telecommunication device 400 according to FIG. 4 is configured to receive an audio signal 410 to be transmitted and to generate a transmission signal 412 based thereon. Furthermore, the telecommunication device 400 is configured to receive a signaling transmission signal 450 from a further telecommunication device. Furthermore, the telecommunication device 400 is configured to output a signaling 420 to a user of the telecommunication device 400. It is to be noted that the audio signal 410 to be transmitted corresponds to the audio signals 110, 210, 310 so that the above comments still apply. Furthermore, it is to be noted that the transmission signal 412 corresponds to the above-described transmission signals 112, 212, 312.

Furthermore, the telecommunication device 400 includes an audio signal transmission means 430 corresponding to the above-described audio signal transmission means 130, 230, 330.

The telecommunication device 400 further includes a signaling means 440 configured to receive the signaling transmission signal 450 from a further telecommunication device and to output the signaling 420 based thereon. Thus, the signaling means 440 does not necessarily comprise its own signal processing, but may rely in a simplest case on the information contained in the signaling transmission signal 450. In this case, the signaling transmission signal 450 includes information indicating whether there is a concern that the audio signal, which is typically contained in the transmission signal 412, is acoustically understandable for third parties or represents a disturbance for third parties. If the signaling means 440 finds corresponding information in the signaling transmission signal 450, the signaling means 440 causes a signaling 420. However, if the signaling transmission signal 450 indicates that there is no concern that the audio signal is acoustically understandable for third parties, the signaling means 440 deactivates the signaling 420. Thus, the telecommunication device 400 is configured to interact with a "cooperative" further telecommunication device. In this case, the telecommunication device 400 relies on the further telecommunication device (not shown in FIG. 4) to signalize when there is a concern that the audio signal transmitted from the telecommunication device 400 to the further telecommunication device is acoustically understandable for (typically unauthorized) third parties. For example, the further telecommunication device may insert a corresponding signaling into the signaling transmission signal 450 when the audio signal transmitted by the signaling device 400 is output by a handsfree unit of the further telecommunication device (wherein the output by a handsfree unit typically involves the danger of unauthorized third parties being able to listen in).

Thus, it is to be noted that the telecommunication device 400 examines signals received from a further telecommunication device as to whether they contain a signaling indicating that there is a concern that the audio signal is acoustically understandable for third parties and/or a disturbance for third parties. In other words, the telecommunication device 400 may search the signals, or the data messages, received from the further telecommunication device for information specified accordingly, and the signaling means 440 may output the signaling 420 in response to the presence of the corresponding signaling information.

Thus, through the interaction of the telecommunication device 400 with an accordingly cooperative further telecommunication device, it is possible to warn the user of dangers for the privacy of this/her conversation when these privacy risks are present on the side of the further telecommunication device, because a loudspeaker unit, or a handsfree unit, is activated at the further telecommunication device, for example.

5. Signaling Means According to FIG. 5

Figure 5:
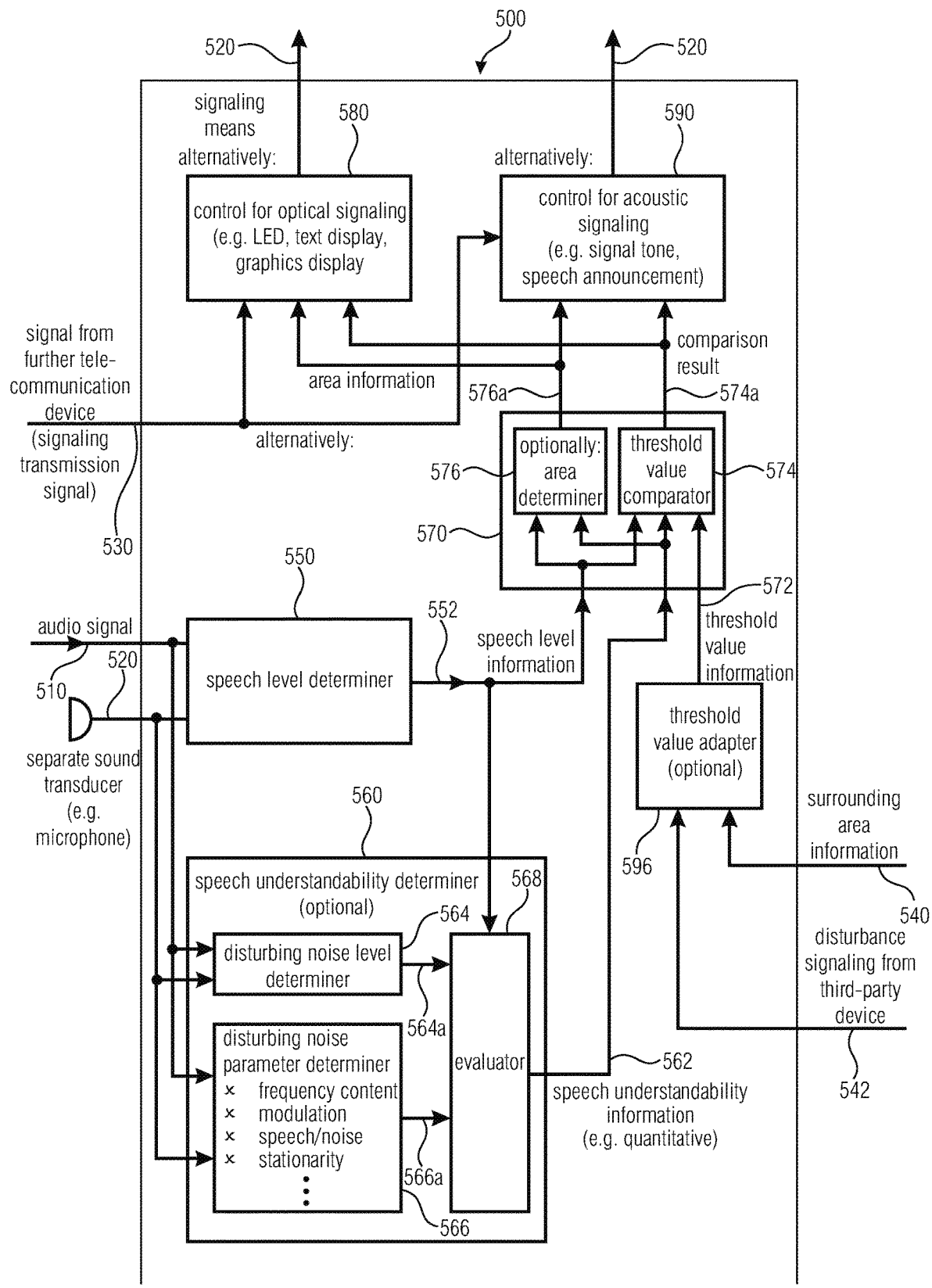
FIG. 5 shows a block diagram of a signaling means according to an embodiment of the present invention.

FIG. 5 shows a block diagram of a signaling means 500 according to an embodiment of the present invention. For example, the signaling means 500 may replace the signaling means 140, the signaling means 240, the signaling means 340 or the signaling means 440.

It is to be noted that the signaling means 500 according to FIG. 5 comprises a very extensive functionality. In particular, however, it is also possible that the signaling means 500 only comprises part of the functionalities described in the following, wherein the signaling means 500 is typically configured to output a signaling when there is a concern that the audio signal is acoustically understandable for third parties and/or represents a disturbance for third parties. However, the manner in which the signaling means detects that there is a concern that the audio signal is acoustically understandable for third parties or represents a disturbance for third parties may vary to a great extent, as is described in the following based on FIG. 5.

The signaling means 500 is typically configured to receive an audio signal 510, e.g., corresponding to the above-described audio signals 110, 210, 310, 410. Furthermore, the signaling means is configured to output a signaling 520 that signals that there is a concern that the audio signal is acoustically understandable for third parties or represents a disturbance for third parties.

In addition to the audio signal 510, the signaling means may receive in some embodiments a further audio signal 520 from a separate sound transducer (e.g., microphone), wherein the separate sound transducer does typically not form part of the signaling means 500. Using this additional audio signal 520 is to be considered as optional.

The signaling means 500 may further be configured to receive a signal 530 from a further telecommunication device. For example, this signal 530 may be a signaling transmission signal that is transmitted by the further telecommunication device. The further telecommunication device is typically a telecommunication device with which the present telecommunication device including the signaling means is in an audio communication relationship. In other words, the signaling means typically obtains the signaling transmission signal 530 from a counterpart audio communication device with which the telecommunication device containing the signaling means 500 is currently in a telecommunication relationship (i.e., at the point in time at which the signaling transmission signal of the signaling means 500 is received, for example).

However, it is to be noted that the reception and the evaluation of the signaling transmission signal 530 are to be considered as optional. On the other hand, the reception and the evaluation of the signaling transmission signal 530 may replace the reception and the evaluation of the audio signal 510, or the audio signal 520, in very simple embodiments.

Furthermore, the signaling means 500 is optionally configured to receive environment information 540, e.g., describing characteristics of an environment in which the telecommunication device containing the signaling means is located. For example, the environment information may be delivered by an information determiner contained in the telecommunication device. For example, the environment information 540 may be obtained to signalize that a special need for silence (e.g., define as a command of silence) exists in a certain environment, or that a communication ban (e.g., defined as a call ban) exists in an environment. For example, the environment information may be obtained by the telecommunication device by evaluating prohibition signs or command signs via an optical evaluation unit. Alternatively, e.g., electronic prohibition information or command information (e.g., signalized by a wired or wireless communication of corresponding messages or via the evaluation of RFID identifiers, e.g., via near field communication) may be evaluated. Alternatively, certain commands and/or prohibitions may be inferred from position information determined by the telecommunication device, for example. Thus, a corresponding optical or electronic signaling may take place in a public means of transport, an education facility or a hospital, which is evaluated by the telecommunication device and is used for providing corresponding environment information 540, for example.

Furthermore, the signaling means 520 may be optionally configured to receive a disturbance signaling 542 from a third-party device that, e.g., is currently not in an audio communication relationship with the telecommunication device containing the signaling means. A third-part device, e.g., a mobile phone, a laptop, a tablet computer or any other electronic device, may send a signaling to the telecommunication device containing the signaling means 500, which indicates that there is special need for silence, or that the audio signal generated by the telecommunication device or its user represents a disturbance for a third party. For example, this disturbance signaling 542 from a third-party device may be transmitted via an optical, electric or acoustic signal, or via an optical, electric or acoustic message, wherein it is in some cases not necessary that the user of the third-party device knows an electronic identifier of the telecommunication device containing the signaling means. For example, a user of a third-party device may direct an optical signal generator (e.g., infrared transmitter or laser transmitter) to point to the "disturbing" telecommunication device (including the signaling means). In this way, the disturbance signaling 542 may be directly sent from the third-party device to the telecommunication device containing the signaling means 500. Alternatively, a network provider may help to send the disturbance signaling 542 from the third-party device to the telecommunication device containing the signaling means 500. For example, if the user of the third-party device realizes that he/she is being disturbed at a public location by other callers, he/she may indicate this to the network provider (e.g., telecommunication provider) responsible for him/her with a corresponding data message, and the network provider may then send a disturbance signaling 542 to all telecommunication devices located in a certain surrounding area around the telecommunication device of the disturbed user. In summary, there are many different ways to send a disturbance signaling 542 from a third-party device to a telecommunication device containing the signaling means 500, or to the signaling means 500 itself.

The information received by the signaling means 500 (audio signal 510, additional audio signal 520, signaling transmission signal 530, environment information 540 and disturbance signaling 542 from a third-party device) may be evaluated by the signaling means in order to generate a meaningful signaling based thereon, indicating when there is a concern that the audio signal is acoustically understandable for third parties or represents a disturbance for third parties.

The different functional units generating the signaling in different situations, or depending on different input information, are described in the following.

The speech level-based generation of the signaling is a first important functional unit. The speech level-based functional unit includes a speech level determiner 550, an optional speech understandability determiner 560 as well an evaluation unit 570. The speech level determiner 550 is configured to receive the audio signal 510 and/or the additional audio signal 520 and to determine speech level information 552 based thereon. For example, the speech level determiner 550 may deliver the speech level information 552 in such a way that the speech level information 552 represents a measurement for an acoustic volume of the speech signal 510 and/or the additional speech signal 520 captured by the separate sound transducer.

The speech understandability determiner 560 may be present in addition to the speech level determiner 550. In some embodiments, the speech understandability determiner 560 may also replace the speech level determiner 550 so that the speech level determiner 550 is not required anymore. The speech understandability determiner 560 is configured to receive the audio signal 510 and/or the additional audio signal 520 from the separate sound transducer and to generate speech understandability information 562 based thereon. For example, the speech understandability determiner may comprise a disturbing noise level determiner 564 and (optionally) a disturbing noise parameter determiner 566. For example, the disturbing noise level determiner 564 may be configured to determine a signal-to-noise ratio (e.g., by separating speech signal components and background noise components). Alternatively, the disturbing noise level determiner 564 may also be configured to determine the intensity (e.g., in the sense of volume information) of a background noise. In this regard, different concepts are conceivable that are known to the person skilled in the art. In particular, the disturbing noise level determiner 564 may use known information about characteristic features of speech signals in order to separate speech signal components from background noise signal components (which may be regarded as disturbing noise signal components).

Thus, the disturbing noise level determiner 564 delivers disturbing noise level information 564a. For example, the disturbing noise parameter determiner 566 may be configured to determine disturbing noise parameter information 566a, e.g., including information about a frequency content of a disturbing noise, information about a modulation of the disturbing noise or information about a stationarity of the disturbing noise. Furthermore, the disturbing noise parameter information 566a may also contain information as to whether the disturbing noise is a speech signal (e.g., a speech signal of distant other speaker that differs from the user of the telecommunication device) or is a general noise-like disturbing noise. For example, the speech understandability determiner 560 further includes an evaluator 568 configured to determine the speech understandability information 562 based on the speech level information 552, the disturbing noise level information 564a and, possibly additionally, the disturbing noise parameter information 566a. For example, the evaluator 568 may evaluate the various input information differently, wherein linear or non-linear connections may be used. For example, the evaluator 568 may compare the speech level information 552 to the disturbing noise level information 564a in order to find out how much higher the speech level of a "nearby user" of the telecommunication device is than a disturbing level (which originates from the speech of a distant person and/or from noise-like background noises). For example, if the speech level information 552 indicates that the speech level of the speech signal of the "nearby user" is only slightly higher than a disturbing level described by the disturbing level information 564a, the speech understandability information 562 may indicate that the speech understandability is comparably bad, or comprises a low value. However, if the speech level of a nearby user described by the speech level information 552 is significantly higher than a disturbing noise level (described by the disturbing noise level information 564a), the speech understandability information 562 may indicate a comparably high speech understandability (or have a comparably high value). In this case, the optional disturbing noise parameter information 566a may also have an influence. For example, if the frequency content of the disturbing noise is in a speech frequency band, this may lead to a comparably low value of the speech understandability information 562. For example, the fact (determined by the disturbing noise parameter determiner) that a background noise, or disturbing noise, is speech-like (i.e., includes speech signals of distant third parties, for example), may lead to a decreased value of the speech understandability information 562.

In summary, it is to be noted that the speech understandability determiner 560 forms the speech understandability information 562 such that the same represents a quantitative measurement as to how well the speech of a near speaker, typically the user of the telecommunication device, is understandable in view of the ambient noise. The levels and also the characteristics of the speech signals and/or the ambient noise may be considered.

For example, the evaluator 570 is configured to receive the speech level information and/or the speech understandability information. The evaluator 570 may further receive threshold value information 572 or use a specified threshold value. For example, the evaluator 570 includes a threshold value comparator 574 configured to compare the speech level information 552 and/or the speech understandability information 562 with a fixed or variable threshold value (wherein the latter may be described by the threshold value information 572). For example, the threshold value comparator 574 delivers a comparison result 574a which depends on whether a value of the speech understandability information 562 is larger or smaller than a fixed or variable threshold value, or depends on whether a value of the speech level information 552 is larger or smaller than a fixed or variable threshold value. Optionally, the evaluator 570 further includes an area determiner 576 configured to, based on the speech level information 552 and/or based on the speech understandability information 562, deliver area information 576a which indicates within which area (or within which periphery) a speech signal (e.g., the speech signal of the nearby user of the telecommunication device) is perceivable with a predetermined volume or quality (e.g., defined by a speech signal-to-background noise-volume-ratio). For example, the area information may indicate that the speech signal (e.g., of the nearby user) is understandable with a good speech understandability (e.g., with a signal-to-noise ratio corresponding at least to a specified value) in a periphery of x meters around the telecommunication device (or around another point of reference).

The signaling means 500 further includes a controller 580 for an optical signaling and/or a controller 590 for an acoustic signaling. For example, the controller 580 for an optical signaling may be configured to control a light-emitting diode, a text display or a graphics display depending on the comparison result 574a such that, e.g., a warning signaling is output when the value of the speech level information 552, or the value of the speech understandability information 562, is larger than a specified fixed variable threshold value. In a similar way, the controller 590 may cause or output an acoustic warning tone (e.g., a signal tone and/or a speech message) for the acoustic signaling when the value of the speech level information 552, or the value of the speech understandability information 562, is larger than the specified threshold value. Additionally, the controller 580 for the optical signaling, or the controller 590 for the acoustic signaling, may consider the area information 576a and therefore indicate, e.g., that the speech understandability is given for third parties (with a certain quality) in a certain periphery (e.g., of x meters) and/or in a certain area around the telecommunication device or around the user of the telecommunication device.

Thus, the signaling 520 may be supplied based on the speech level information 552 and/or the speech understandability information 562, for example.

Further optional variations and/or improvements are described in the following.

For example, the above-described signaling transmission signal 530 may be directly supplied to the controller 580 for the optical signaling and/or the controller 590 for the acoustic signaling. Thus, the signaling means 500 may directly and without further evaluations use the signaling transmission signal 530 delivered by the further telecommunication device in order decide whether an optical signaling and/or an acoustic signaling 520 is to be output. This approach is recommended in order to signalize, e.g., that the speech signal of the user of the telecommunication device is audible on the side of a remote further telecommunication device for third parties, e.g., due to using a handsfree unit on the side of the remote further telecommunication device. Thus, based on the signaling transmission signal 530 delivered by the further telecommunication device, the signaling means may very efficiently decide whether a signaling 520 is to occur or not.

Furthermore, it is to be noted that using the signaling transmission signal 530 may entirely replace using the speech level information 552, or the speech understandability information 562, in very simple embodiments.

Optionally, the signaling means 500 further includes the threshold value adapter 596. For example, the threshold value adaptor 596 is configured to receive the environment information 540 and/or the disturbance signaling 542 from a third-party device, and to adapt the threshold value information 572 supplied by the threshold value comparator 574 depending thereon. For example, the threshold value adaptor 596 may lower the threshold value information 572 (so that the threshold value comparator 574 delivers already at a low speech understandability value of the speech understandability information 562 a comparison result 574 triggering a signaling 520) when the environment information indicates that a comparably low tolerance for conversations exists in a certain environment (e.g., which may be the case in an environment with a command of silence or a call ban). In other words, if the environment information 540 indicates that a command of silence or call ban exists, a signaling that there is a concern for a disturbance of third parties takes place earlier (i.e., at a comparably low value of the speech understandability information). In a similar way, a value of the threshold value information 572 (compared to a normal value of the threshold value information) may be lowered when a disturbance signaling 542 from a third-party device is received by the threshold value adaptor 596. Thus, the disturbance signaling 542 from the third-party device may lead to lowering a "tolerance threshold" of the threshold value comparator, which warns a user of the telecommunication device about a concern of a disturbance for third parties at a comparably low speech level or at a comparably low speech understandability. Thus, a potentially disturbed third party may cause, by generating a disturbance signaling (with his/her third-party device), that the user of the telecommunication device is already being warned about a possible disturbance of the third party when speaking softly, a direct communication between the user of the telecommunication device and the disturbed third party that may possibly lead to conflicts not being necessary.

Thus, in summary, it is to be noted that the signaling means may apply different criteria in order to decide whether a signaling (either optically or acoustically) is to be output. In very simple cases, a volume of the audio signal 510 or a signaling transmission signal 530 may be used in order to decide whether a signaling (e.g., to the user of the telecommunication device containing the signaling means) is to be output or not. Additional details may also be evaluated, e.g., the speech understandability. Furthermore, the environment situation (via the environment information 540) or a signaling from disturbed third parties (via the disturbance signaling 542 from a third-party device) may also be considered in order decide about the signaling.

6. Embodiment According to FIG. 6

Figure 6:
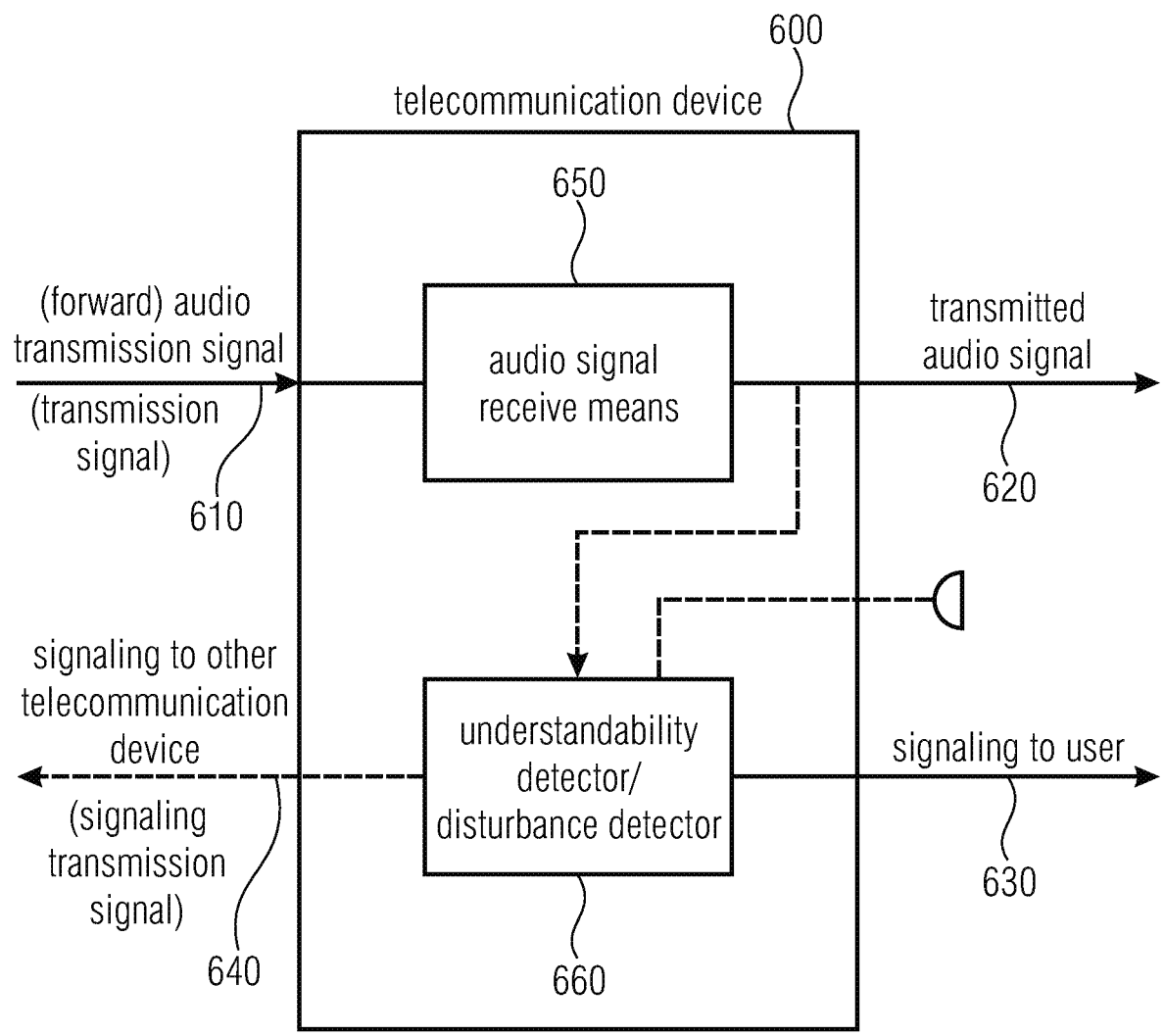
FIG. 6 shows a block diagram of a telecommunication device according to an embodiment of the present invention.

FIG. 6 shows a block diagram of a telecommunication device according to a further embodiment.

The telecommunication device 600 is configured to receive a (forward) audio transmission signal 610 from another remote telecommunication device. For example, the audio transmission signal 610 may correspond to the transmission signal 112, 212, 312, 412, as is described above. The telecommunication device 600 is further configured to output a transmitted audio signal 620. For example, the output transmitted audio signal 620 may essentially (ignoring losses, or variations due to the transmission) correspond to the audio signal 110, 210, 310 captured by the other telecommunication device.

The telecommunication device is further configured to output a signaling 630, 640 to the user of the telecommunication device 600 or to another telecommunication device.

For example, the telecommunication device 600 includes an audio signal receive means 650 configured to receive an audio signal (e.g., in the form of the audio transmission signal 610) from a further telecommunication device (e.g., from the "other" telecommunication device) and to acoustically output the same (e.g., as transmitted audio signal 620).

The understandability detector/disturbance detector 660, which may also be considered as the signaling means, is configured to output a signaling 630, 640 when there is a concern that the output audio signal is acoustically understandable for third parties or represents a disturbance for third parties. Thus, the understandability detector/disturbance detector 660 may obtain information regarding the volume of the (acoustically output) transmitted audio signal 620, for example. Alternatively or additionally, the understandability detector/disturbance detector 660 may obtain and process information as to how the transmitted audio signal is output. For example, the understandability detector/disturbance detector 660 may obtain information as to how the transmitted audio signal is output, i.e., whether the transmitted audio signal is output via a sound transducer optimized for a single listener or via a sound transducer optimized for several listeners. For example, if the understandability detector/disturbance detector detects that the transmitted audio signal is output by a handsfree unit or loudspeaker unit, this may cause a signaling or may lower a volume threshold starting from which a signaling is output, for example. However, if the understandability detector/disturbance detector determines that the transmitted audio signal is output via a headphone or via a mobile phone loudspeaker optimized for a direct sound output at the ear of the mobile phone user, a signaling may be suppressed, or the volume threshold starting from which the signaling is carried out may be selected to be comparably high. Thus, the type and characteristic of the sound transducer may be considered by the understandability detector/disturbance detector when deciding whether a signaling is to take place or not. Furthermore, it is to be noted that the understandability detector/disturbance detector 660 may alternatively or additionally also comprise one or several of the functionalities of the signaling means 500. For example, the understandability detector/disturbance detector 660 also receives information from a separate sound transducer that essentially corresponds to the separate sound transducer 520 described based on FIG. 5. For example, the understandability detector/disturbance detector 660 may comprise the functionalities of the speech level determiner 550, the understandability determiner 560, the evaluator 570 and the controllers 580, 590 for the optical and acoustical signaling, respectively. A threshold value adaptor 596 may also be contained in the understandability detector/disturbance detector 660.

Furthermore, it is to be noted that the signaling may take place in different ways. For example, the signaling 630 may take place to the user of the telecommunication device 600. In this case, signaling means may be used as described in connection with the signaling means 500. In other words, the signaling 630 may correspond to the signaling 520, for example.

Alternatively, the signaling may also take place as a signaling 640 to another telecommunication device. In particular, this makes sense when the signaling 640 contains information as to whether there is a concern that the audio signal is acoustically understandable for third parties. Thus, the telecommunication device 600 may signalize, e.g., to another telecommunication device from which it receives the audio transmission signal 610, when the transmitted audio signal 620 is output such that there is a concern that it is understandable for (unauthorized) third parties that are located near to the telecommunication device 600.

On the other hand, the telecommunication device 600 may also signalize to its own user when there is concern that the acoustically output transmitted audio signal 620 is acoustically understandable for third parties and/or represents a disturbance for third parties.

In other words, the telecommunication device having the understandability detector/disturbance detector may output a corresponding signaling 630, 640 to the other telecommunication device from which it receives the audio transmission signal 610 or to its own user or to both when there is a concern that the transmitted audio signal is acoustically understandable for third parties or represents a disturbance for third parties. The details as to who the signaling is output to (user of the telecommunication device 600; other telecommunication device) vary from embodiment to embodiment, as is explained.

7. System According to FIG. 7

Figure 7:
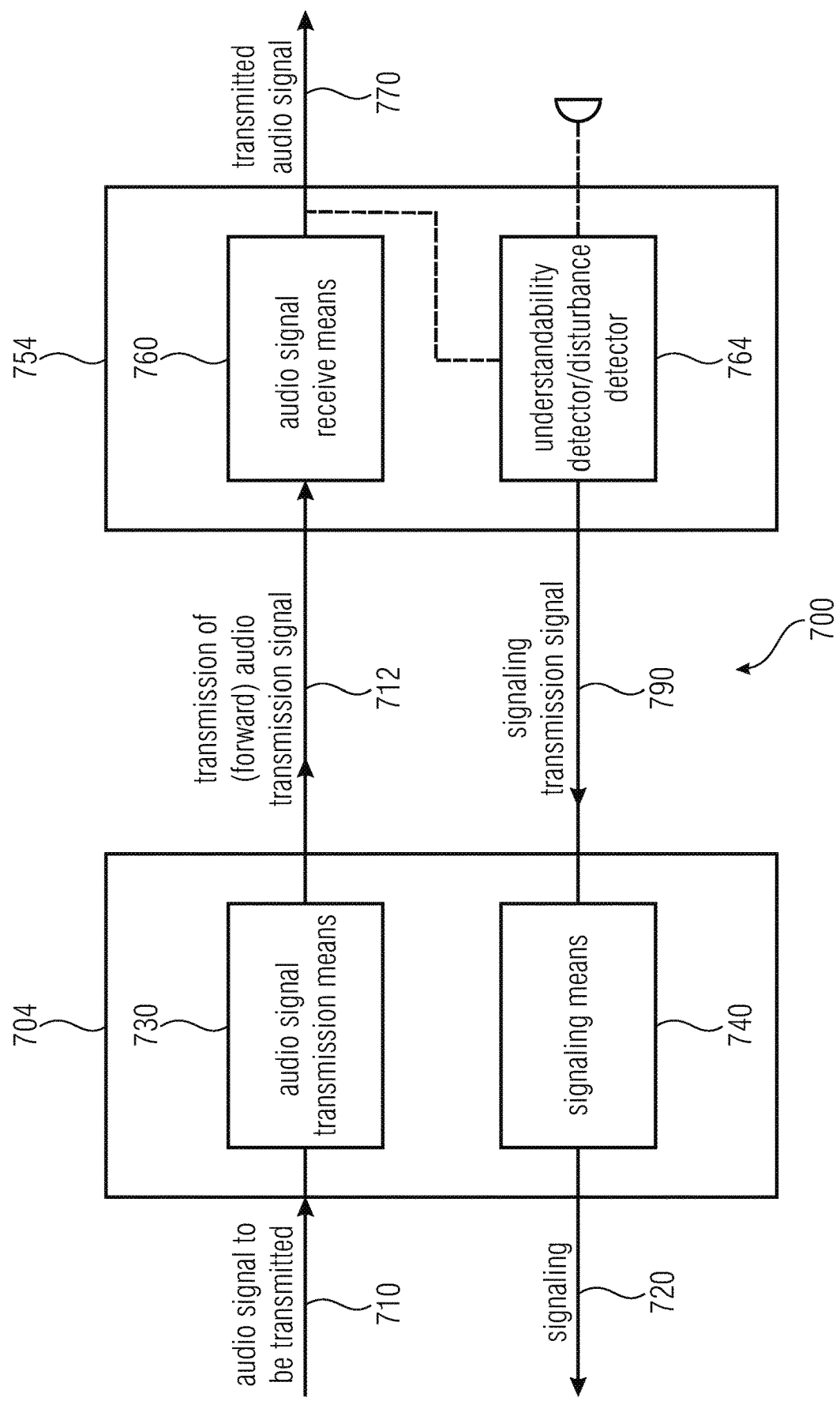
FIG. 7 shows a block diagram of a telecommunication device according to an embodiment of the present invention.

FIG. 7 shows a block diagram of a telecommunication system according to an embodiment of the present invention.

The telecommunication system 700 according to FIG. 7 includes a first telecommunication device 704 and a second telecommunication device 754. The first telecommunication device 704 receives an audio signal 710 to be transmitted and generates, based thereon, a (forward) audio transmission signal 712 that is transmitted to a second telecommunication device 754. The first telecommunication device 704 further provides a signaling 720 to its user, or outputs this signaling to its user (e.g., from who the audio signal 710 to be transmitted essentially originates).

The second telecommunication device 754 receives the (forward) audio transmission signal 712 (wherein the transmission from the first telecommunication device 704 to the second telecommunication device 754 may take place via communication network such that one or several transmission means, distribution means and the like may be connected between the first telecommunication device 704 and the second telecommunication device 754). The second telecommunication device 754 outputs a transmitted audio signal 770 (typically in an acoustic form) to a user. Furthermore, the second telecommunication device 754 provides a signaling transmission signal 790 which is transmitted to the first telecommunication device 704 (e.g., via the communication network).

For example, the first telecommunication device 704 includes an audio signal transmission means 730 configured to receive the audio signal 710 from the user and to transmit the same to the further (second) telecommunication device 754 (e.g., in the form of the (forward) audio transmission signal 712).

The second telecommunication device includes an audio signal receive means 760 configured to receive the audio signal from the first telecommunication device 704 (e.g., in the form of the audio transmission signal 712) and to output the same acoustically (e.g., in the form of the transmitted audio signal 770). Furthermore, the second telecommunication device 754 includes a signaling means 764 configured to output a signaling signal to the first telecommunication device (e.g., the signaling transmission signal 790) when there is a concern that the audio signal 770 output via the second telecommunication device is acoustically understandable for third parties or represents a disturbance for third parties. Furthermore, the first telecommunication device 704 comprises a signaling means 740 configured to, in response to the signaling signal received from the second telecommunication device 754 (the signaling transmission signal 790), output a signaling in order to signalize to the user of the first telecommunication device 704 that there is a concern that the audio signal 770 output by second telecommunication device 754 is acoustically understandable for third parties or represents a disturbance for third parties.

Thus, by the interaction of the first telecommunication device 704 and the second telecommunication device 754, the telecommunication system 700 makes it possible that a user of the first telecommunication device is informed by the signaling 720 when the transmitted audio signal 770 acoustically output on the side of the (typically remote) second telecommunication device 754 represents a disturbance for third parties or when there is a concern that the acoustically output transmitted audio signal 770 is understandable for third parties. Thus, the user of the first telecommunication device 704 may adapt his/her call behavior and/or ask a user of the second telecommunication device 754 to avoid disturbances of the third party or to take better care of the privacy of the telephone call.

Furthermore, it is to be noted that the first telecommunication device 704 may, e.g., correspond to the above-described telecommunication device 400. For example, the second telecommunication device 754 may correspond to the above-described telecommunication device 600.

The functionalities of the above-described telecommunication devices 100, 200, 300 may also be integrated into the telecommunication devices 704, 754 in order to further extend their functionality.

Thus, it is to be noted that the system according to FIG. 7 may ensure a particularly good privacy due to the fact that a user even obtains a signaling when there is a privacy problem at a "remote end" of a telecommunication connection.

8. Method According to FIG. 8

Figure 8:
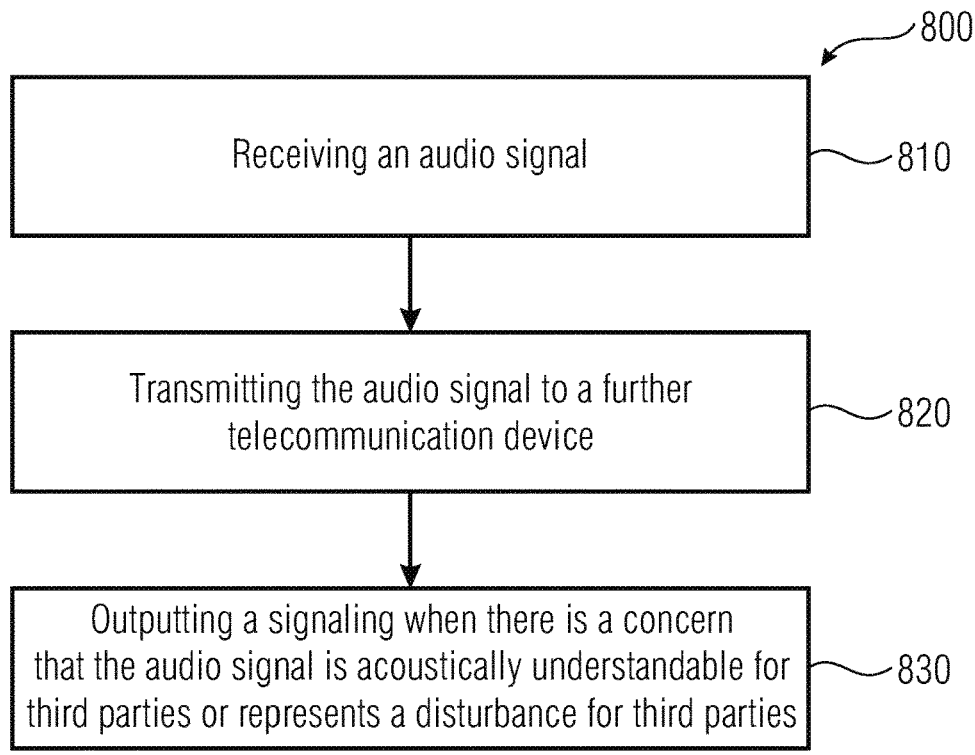
FIG. 8 shows a flow diagram of a method according to an embodiment of the present invention.

FIG. 8 shows a flow diagram of a method according to an embodiment of the present invention.

The method 800 includes receiving 810 an audio signal as well as transmitting 820 the audio signal to a further telecommunication device. The method 800 further includes outputting 830 a signaling when there is a concern that the audio signal is acoustically understandable for third parties or represents a disturbance for third parties.

The method described herein is based on the same concepts as the above-described apparatus.

Furthermore, the present method may include all features and functionalities that were described above regarding the apparatuses according to the invention.

9. Method According to FIG. 9

Figure 9:
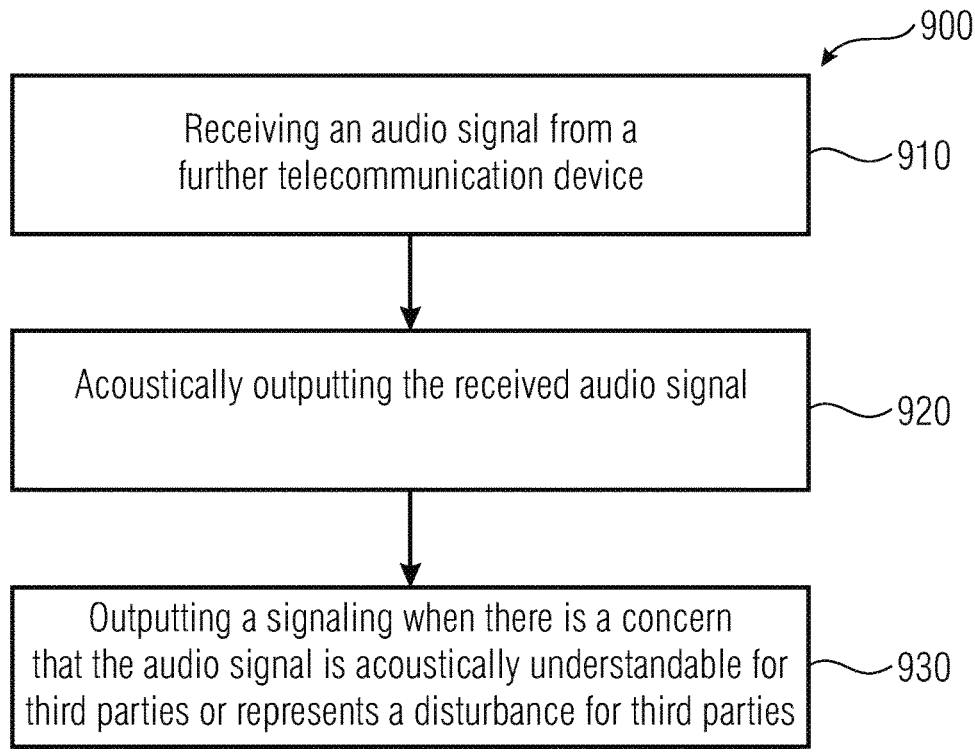
FIG. 9 shows a flow diagram of a method according to a further embodiment of the present invention.

FIG. 9 shows a flow diagram of a method 900 for operating a telecommunication device. The method 900 includes receiving 910 an audio signal from a further telecommunication device.

The method 900 further includes acoustically outputting 920 the received audio signal. The method 900 further includes outputting 930 a signaling when there is a concern that the output audio signal is acoustically understandable for third parties or represents a disturbance for third parties.

The method 900 is based on the same concepts as the above-described apparatuses. Furthermore, the method 900 may include all features and functionalities as described above regarding the apparatuses according to the invention.

10. Conclusion and Other Aspects

Some aspects of the above-described process and the above-described method for measuring and presenting an individual speech level in telephony are described in the following.

Embodiments of the present invention are based, among other things, on the finding that mobile telephony allows telephony to be used at almost anywhere in the world. It has been found that this often happens to the disappointment of people in the vicinity of the caller, who have to follow the caller's speeches whether they like it or not. It has been found that this is particularly drastic or problematic if the caller speaks particularly loudly. Observations have shown that it is often not the intention of the caller (e.g., a user of a telecommunication device) to speak particularly loudly. However, it has been found that loud speech practically automatically occurs when the connection is bad or when there is a very loud background noise on the opposite side (at the remote location, i.e., at a location of a further telecommunication device 754, for example), which the caller then tries to compensate (at the nearby location, e.g., at a location of his/her telecommunication device 704), although modern methods of voice transmission practically automatically adopt such a level compensation during encoding (e.g., via the means 730) and decoding (e.g., via the means 760) of the speech signal.

A first aspect of the invention consists of measuring the speech level caused by the caller (e.g., by the user of the telecommunication device 100, 200, 300) at the nearby location (i.e., at the location at which the caller, or his/her telecommunication device 100, 200, 300, is located) and displaying the level based thereon in an appropriate manner, e.g., on a screen of the mobile phone (i.e., the telecommunication device 100, 200, 300, for example), e.g., when calling with a headset, or on a screen connected to the device, e.g., an intelligent watch (e.g., "Apple Smartwatch"), or by playback of a special acoustic signal (audio hint or "audio icon") which indicates a special volume at the nearby location.

A second aspect of the invention is like the first aspect, however, a determination of the speech understandability (e.g., the speech understandability information 562) is carried out based on different parameters describing the listening situation in the nearby space, i.e., at least the speech level of the caller (e.g., the speech level information 552). However, possible but not final extensions with regard to the detected parameters may also be its disturbance level and disturbance frequency content as well as the nature of the disturbing noise (modulation, other speaker, continuous background noise and others) in the nearby space, reverberation time, and others.

A third aspect of the invention is like the first or the second aspect, but with a visualization of how the speech level or speech understandability is distributed in a surrounding area (e.g., by displaying the area information 576a). It could be shown, e.g., that one's own voice is still 100% understandable at a distance of four meters. This may be very impressive for a user, e.g., if the same looks around in a public means of transport (e.g., in the train) and determines who may listen in or listens in.

A fourth aspect of the present invention is like the first aspect or the second aspect or the third aspect, although the voice output of the remote speaker (i.e., a user of a remote telecommunication device 400 in speech connection with one's own telecommunication device 600, for example) via the loudspeaker (e.g., the output of the transmitted audio signal 620), either during normal telephoning or handsfree mode, is captured, determined and optically or acoustically displayed (e.g., via the signaling 630 or the signaling 640) as in the first inventive aspect, the second inventive aspect or the third inventive aspect.

According to a fifth aspect, the representation of the result, as determined in the fourth aspect, takes place at a remote location (i.e., at a remote telecommunication device 400, for example) so that the speaker at the remote location (e.g., the user of the remote telecommunication device 400, i.e., the telecommunication device 400 delivering the forward transmission signal 610 and/or receiving the signaling transmission signal 640, for example) can comprehend how well he/she may be understood by third parties in the vicinity.

A further, sixth aspect of the present invention is like one of the previously described aspects (aspects 1 to 5), but with a different measured parameter, or calculated parameter, which is then illustrated. Here, e.g., an "annoyance factor" would be conceivable, which directly images the "annoyance" achieved by unwanted listening. For example, this value could be higher if telephony is prohibited in a compartment in which, for example ambient information 540 can be evaluated.

Some or all features of the above-described inventive aspects may be realized by the herein-described telecommunication devices and/or the associated methods.

Further suggestions for the actual realization may be taken from the European patent application EP 2 247 082 A1. According to the present invention, however, it is achieved that a speaker at a distant location may avoid that he/she is understood by third parties. Thus, in embodiments of the invention, a different form of representation was used than is conventionally the case.

5. Implementation Alternatives

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transferred via a data communication link, for example via the internet.

A further embodiment includes a processing means, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

The devices described herein can be implemented for example using a hardware apparatus, or by using a computer, or using a combination of a hardware apparatus and a computer.

The devices described herein, or any of the components herein may be at least partially implemented in hardware and/or in software (computer program).

The methods described herein may be implemented, for example, using a hardware apparatus, or by using a computer, or using a combination of a hardware apparatus and a computer.

Method, the methods described herein, or any components of the described herein can be carried out at least in part by hardware and/or software.

The embodiments described above are merely illustrative of the principles of the present invention. It is understood that modifications and variations of the arrangements and the details described herein will be apparent to others skilled. Therefore, it is intended that the invention be limited only by the scope of the following claims and not by the specific details presented herein with reference to the description and explanation of the embodiments.

In the following, further embodiments and application possibilities are described according to aspects of the present invention. These aspects may optionally be combined with all embodiments described herein.

According to an aspect of the present invention, an estimation of a speech understandability (by a third party) in the vicinity of the speaker is used, e.g., to determine or decide whether there is a concern that the audio signal is acoustically understandable for third parties.

Another possible application scenario according to an aspect of the invention is as follows: A user has a confidential conversation at a table with a conversation partner. The user then places a device on the table (e.g., a telecommunication device) which says and/or indicates and/or signalizes whether the conversation may be overheard by a nearby person (without technical aides). According to one aspect of the invention, this device may be a telecommunication device and may evaluate an (estimated) speech understandability (e.g., a signal-to-noise ratio), for example.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;

wherein the signaling unit is configured to consider an acoustic environment of the telecommunication device in determining or calculating the speech understandability;

wherein the signaling unit is configured to consider a reverberation time in determining or calculating the speech understandability.

2. The telecommunication device according to claim 1, wherein the signaling unit is configured to determine or estimate whether there is a concern that the audio signal is acoustically understandable for a third party who is located in a surrounding area of the telecommunication device and who differs from a user of the telecommunication device, and to output the signaling depending thereon.

3. The telecommunication device according to claim 1, wherein the signaling unit is configured to acquire information as to whether there is a concern that the audio signal is acoustically understandable for a third party who is located in a surrounding area of the further telecommunication device and who differs from a user of the further telecommunication device, and to output the signaling depending thereon.

4. The telecommunication device according to claim 1, wherein the signaling unit is configured to determine or estimate whether there is a concern that the audio signal is understandable for a third party who is located in a surrounding area of the telecommunication device, but who is at a larger than specified distance to the telecommunication device.

5. The telecommunication device according to claim 1, wherein the signaling unit is configured to evaluate the received audio signal in order to determine or estimate whether there is a concern that the audio signal is acoustically understandable for a third party who is located in a surrounding area of the telecommunication device and who differs from a user of the telecommunication device, and/or wherein the signaling unit is configured to evaluate a signal from a separate sound transducer in order to determine or estimate whether there is a concern that the audio signal is acoustically understandable for a third party who is located in a surrounding area of the telecommunication device and who differs from a user of the telecommunication device.

6. The telecommunication device according to claim 1, wherein the telecommunication device is configured to receive from the further telecommunication device a signal indicating whether there is a concern that the audio signal, after being output by a sound transducer of the further telecommunication device, is acoustically understandable for a third party who is located in a surrounding area of the further telecommunication device and who differs from a user of the further telecommunication device.

7. The telecommunication device according to claim 1, wherein the signaling unit is configured to output the signaling depending on a speech level of a user of the telecommunication device.

8. The telecommunication device according to claim 1, wherein the signaling unit is configured to output the signaling depending on an acoustic volume of the audio signal at a location of the telecommunication device and/or depending on an electric or digitalized signal level of the received audio signal.

9. The telecommunication device according to claim 1, wherein the signaling unit is configured to determine and output information about a size of an area in which there is a concern that the audio signal is acoustically understandable for third parties.

10. The telecommunication device according to claim 1, wherein the signaling unit is configured to determine and output a measurement for a disturbance of third parties by the audio signal.

11. The telecommunication device according to claim 10, wherein the telecommunication device is configured to detect acoustic characteristics of the surrounding area of the telecommunication device and/or usage guidelines in the surrounding area of the telecommunication device and to determine the measurement for the disturbance of third parties depending thereon.

12. The telecommunication device according to claim 1, wherein the telecommunication device is configured to receive a disturbance signaling from a third-party device that differs from the further telecommunication device, and wherein the signaling unit is configured to trigger an evaluation as to whether there is a concern that the audio signal is acoustically understandable for third parties or represents a disturbance for third parties depending on the disturbance signaling, or to consider the disturbance signaling in the evaluation.

13. A method for operating a telecommunication device, comprising:
receiving an audio signal;
transmitting the audio signal to a further telecommunication device; and
outputting a signaling when there is a concern that the audio signal is acoustically understandable for third parties or represents a disturbance for third parties;
wherein a speech understandability of a speech signal generated by a user of the telecommunication device is determined or estimated for a third party who is located in a surrounding area of the telecommunication device, and wherein the signaling is output depending thereon;
wherein an acoustic environment of the telecommunication device is considered in determining or calculating the speech understandability;
wherein a disturbing noise frequency content and/or a disturbing noise modulation and/or a disturbing noise noisiness and/or a reverberation time is considered in determining or calculating the speech understandability; and
wherein the disturbing noise noisiness describes whether the disturbing noise is more noise-like or more tonal.

14. A non-transitory digital storage medium having a computer program stored thereon to perform the method for operating a telecommunication device, comprising:
receiving an audio signal;
transmitting the audio signal to a further telecommunication device; and
outputting a signaling when there is a concern that the audio signal is acoustically understandable for third parties or represents a disturbance for third parties;
wherein a speech understandability of a speech signal generated by a user of the telecommunication device is determined or estimated for a third party who is located in a surrounding area of the telecommunication device, and wherein the signaling is output depending thereon;
wherein an acoustic environment of the telecommunication device is considered in determining or calculating the speech understandability;
wherein a disturbing noise frequency content and/or a disturbing noise modulation and/or a disturbing noise noisiness and/or a reverberation time is considered in determining or calculating the speech understandability;

wherein the disturbing noise noisiness describes whether the disturbing noise is more noise-like or more tonal,
when said computer program is run by a computer.

15. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise frequency content in determining or calculating the speech understandability.

16. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise modulation in determining or calculating the speech understandability.

17. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise noisiness in determining or calculating the speech understandability;
wherein the disturbing noise noisiness describes whether the disturbing noise is more noise-like or more tonal.

18. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise frequency content and/or a disturbing noise modulation and/or a disturbing noise noisiness and/or a reverberation time in determining or calculating the speech understandability;
wherein the signaling unit is configured to determine or estimate whether there is a concern that the audio signal is understandable for a third party who is located in a surrounding area of the telecommunication device, but who is at a larger than specified distance to the telecommunication device.

19. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise frequency content and/or a disturbing noise modulation and/or a disturbing noise noisiness and/or a reverberation time in determining or calculating the speech understandability;
wherein the telecommunication device is configured to receive from the further telecommunication device a signal indicating whether there is a concern that the audio signal, after being output by a sound transducer of the further telecommunication device, is acoustically understandable for a third party who is located in a surrounding area of the further telecommunication device and who differs from a user of the further telecommunication device.

20. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise frequency content and/or a disturbing noise modulation and/or a disturbing noise noisiness and/or a reverberation time in determining or calculating the speech understandability;
wherein the signaling unit is configured to determine and output information about a size of an area in which there is a concern that the audio signal is acoustically understandable for third parties.

21. A telecommunication device, comprising:
an audio signal transmission unit configured to receive an audio signal and to transmit the same to a further telecommunication device; and
a signaling unit configured to output a signaling when there is a concern that the audio signal is acoustically understandable for third parties or represents a disturbance for third parties;
wherein the signaling unit is configured to determine or estimate a speech understandability of a speech signal generated by a user of the telecommunication device for a third party who is located in a surrounding area of the telecommunication device, and wherein the signaling unit is configured to output the signaling depending thereon;
wherein the signaling unit is configured to consider an acoustic environment of the telecommunication device in determining or calculating the speech understandability;
wherein the signaling unit is configured to consider a disturbing noise frequency content and/or a disturbing noise modulation and/or a disturbing noise noisiness and/or a reverberation time in determining or calculating the speech understandability;
wherein the telecommunication device is configured to receive a disturbance signaling from a third-party device that differs from the further telecommunication device, and wherein the signaling unit is configured to trigger an evaluation as to whether there is a concern that the audio signal is acoustically understandable for third parties or represents a disturbance for third parties depending on the disturbance signaling, or to consider the disturbance signaling in the evaluation.

* * * * *